United States Patent
Hawes et al.

(10) Patent No.: US 8,249,798 B2
(45) Date of Patent: Aug. 21, 2012

(54) VEHICLE PRE-IMPACT SENSING SYSTEM HAVING SIGNAL MODULATION

(75) Inventors: Kevin J. Hawes, Greentown, IN (US); Ronald M. Taylor, Greentown, IN (US); Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 576 days.

(21) Appl. No.: 12/468,880

(22) Filed: May 20, 2009

(65) Prior Publication Data

US 2009/0299632 A1    Dec. 3, 2009

Related U.S. Application Data

(60) Provisional application No. 61/130,236, filed on May 29, 2008.

(51) Int. Cl.
*G05D 1/02* (2006.01)

(52) U.S. Cl. ........................................ 701/300
(58) Field of Classification Search .................. None
See application file for complete search history.

(56) References Cited

U.S. PATENT DOCUMENTS

| | | | | |
|---|---|---|---|---|
| 5,635,920 | A * | 6/1997 | Pogue et al. | 340/901 |
| 6,298,311 | B1 | 10/2001 | Griffin et al. | |
| 7,592,944 | B2 * | 9/2009 | Fullerton et al. | 342/57 |
| 7,746,450 | B2 * | 6/2010 | Willner et al. | 356/28 |
| 7,831,358 | B2 * | 11/2010 | Breed et al. | 701/45 |
| 7,961,094 | B2 * | 6/2011 | Breed | 340/541 |
| 2005/0093745 | A1 * | 5/2005 | Krumm et al. | 342/465 |
| 2007/0135984 | A1 * | 6/2007 | Breed et al. | 701/45 |
| 2008/0245952 | A1 | 10/2008 | Troxell et al. | |
| 2009/0099736 | A1 | 4/2009 | Hawes et al. | |

OTHER PUBLICATIONS

Texas Advanced Optoelectrnic Solutions® (TAOS), "TSL230RD, TSL230ARD, TSL230BRD Programmable Light-To-Frequency Converters," TAOS054L—Aug. 2007, 14 pages.
OSRAM—Opto Semiconductors, "IR-Lumineszenzdiode (850 nm) mit hoher Ausgangsleistung, High Power Infrared Emitter (850 nm) Lead (Pb) Free Product—RoHS Compliant, SFH 4230," Mar. 29, 2007, 8 pages.

* cited by examiner

*Primary Examiner* — Thomas Tarcza
*Assistant Examiner* — Nagi Murshed
(74) *Attorney, Agent, or Firm* — Lawrence D. Hazelton

(57) ABSTRACT

A vehicle pre-impact sensing system is provided that includes an array of energy signal transmitters mounted on a vehicle for transmitting signals within multiple transmit zones spaced from the vehicle and an array of receiver elements mounted on the vehicle for receiving signals reflected from an object located in one or more multiple receive zones indicative of the object being in certain one or more zones. A processor processes the received reflected signals and determines range, location, speed and direction of the object, determines whether the object is expected to impact the vehicle as a function of the determined range, location, speed and direction of the object, and generates an output signal indicative of a pre-impact event. The system may detect one or more features of a target object, such as a front end of a vehicle. Additionally, the system may modulate the transmit beams. Further, the system may perform a terrain normalization to remove stationary items.

10 Claims, 20 Drawing Sheets

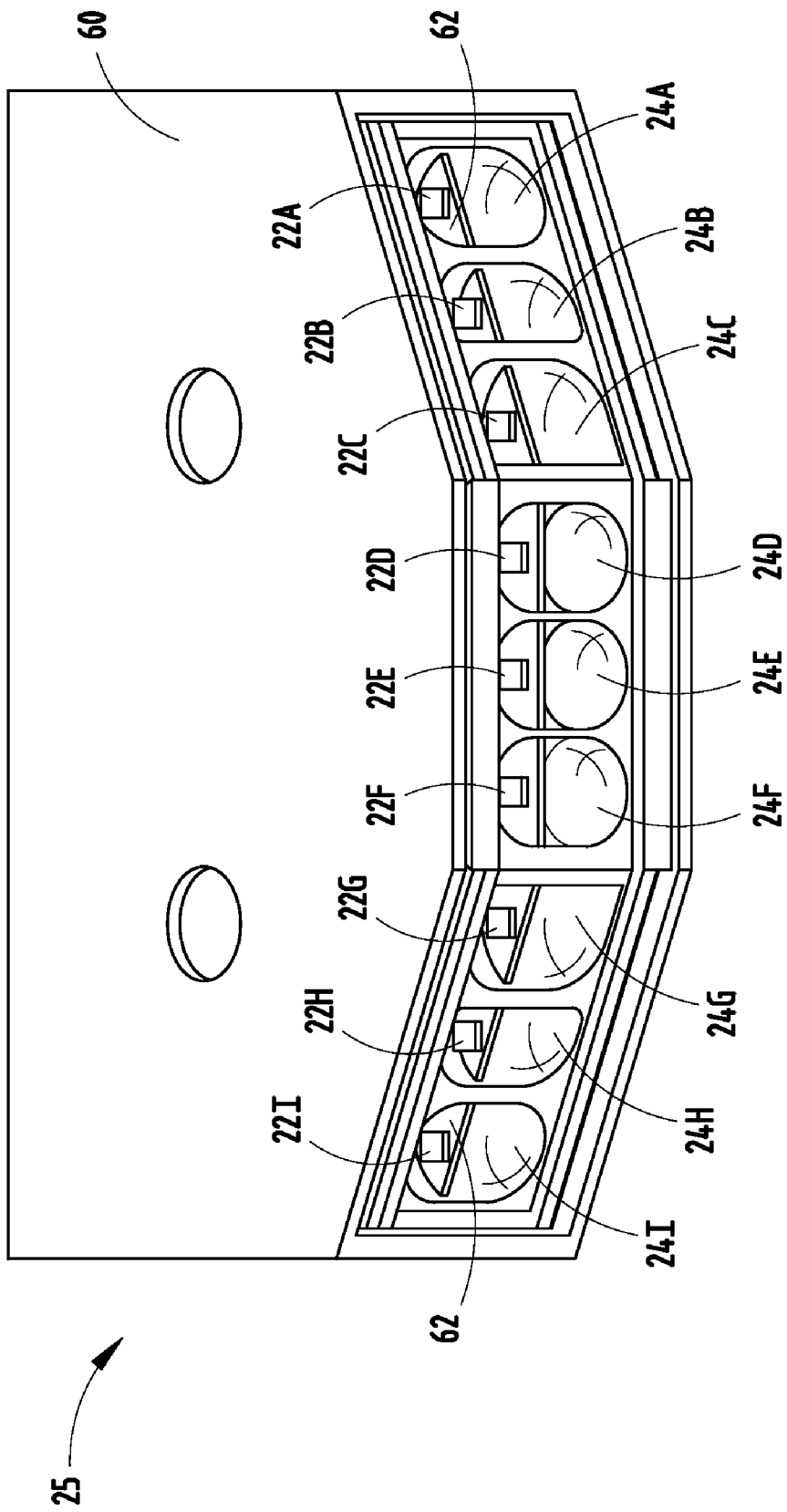

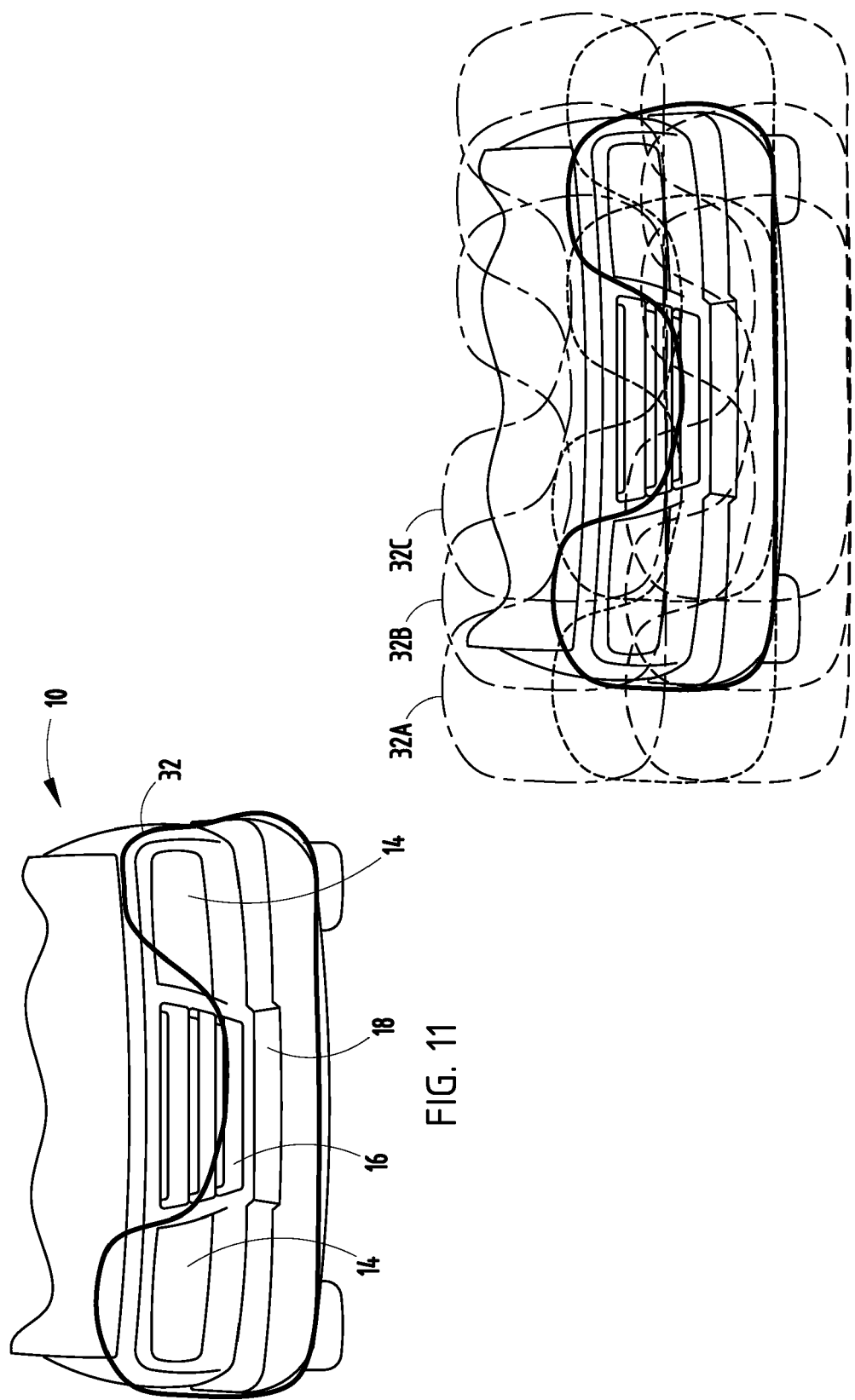

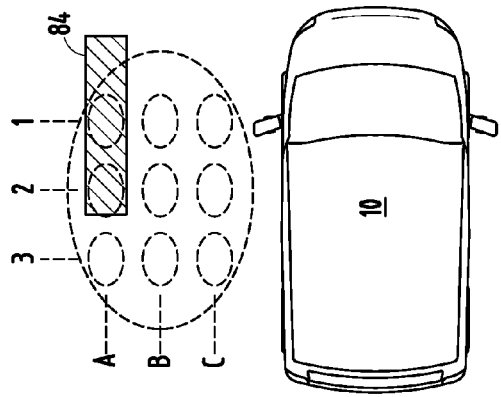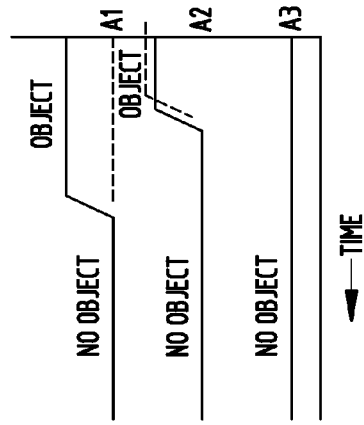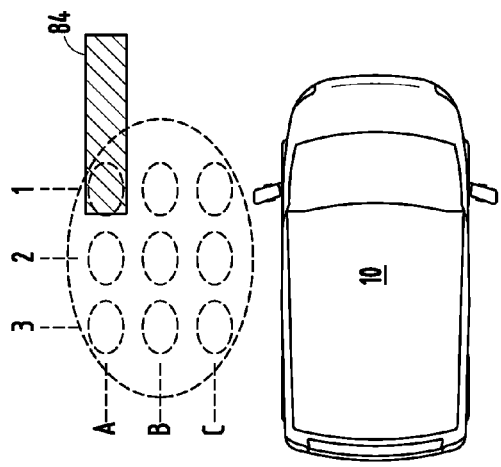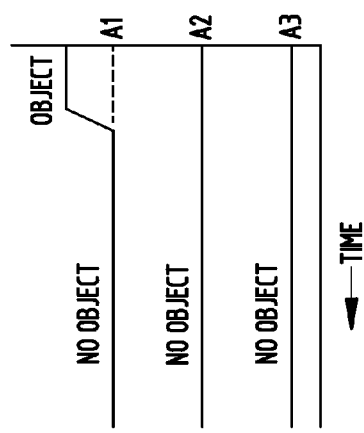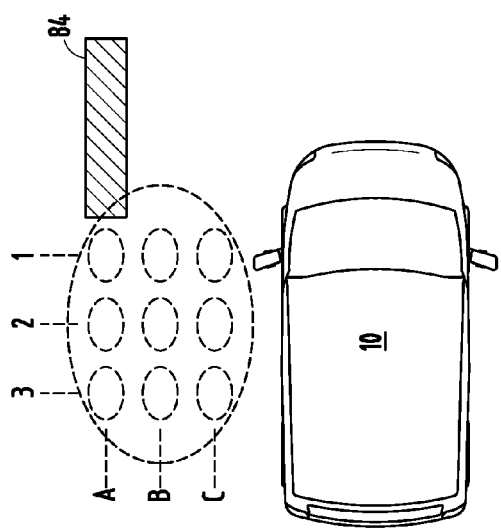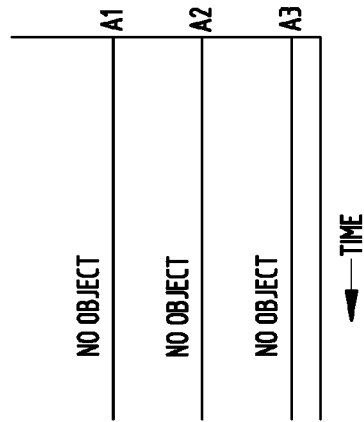

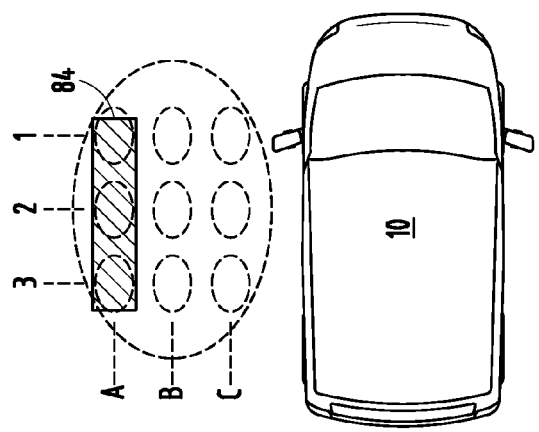
FIG. 15E
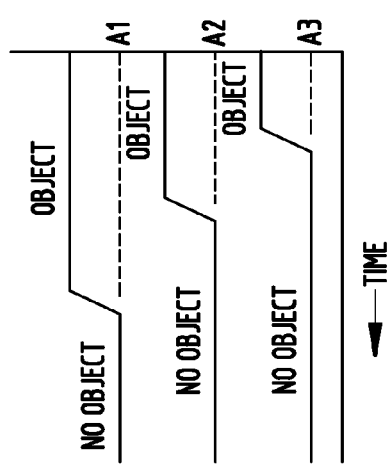
FIG. 15E-E
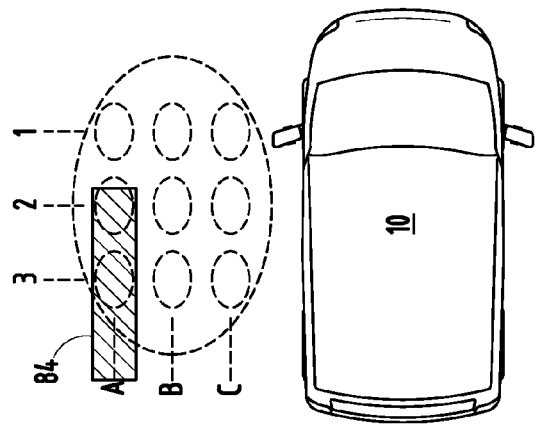
FIG. 15D
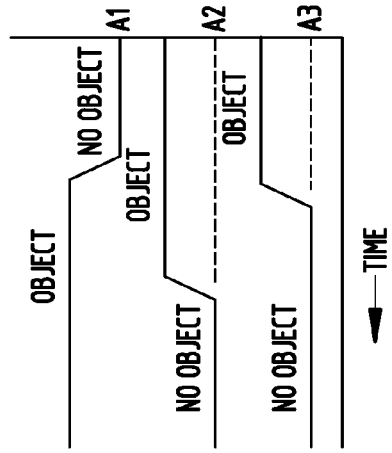
FIG. 15D-D

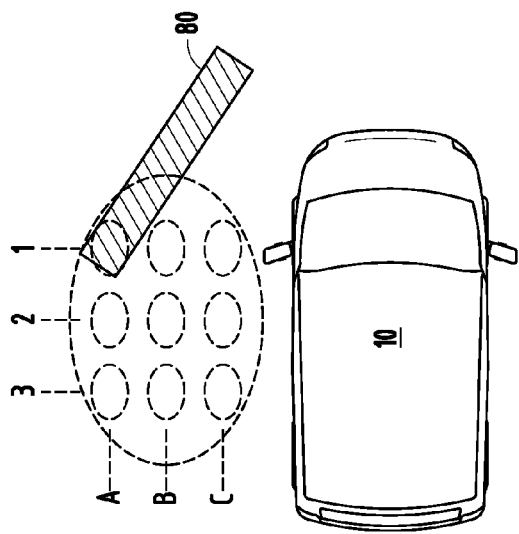
FIG. 16B
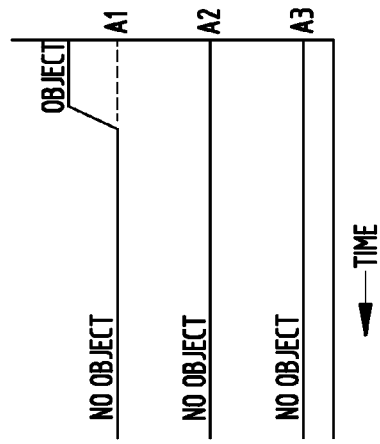
FIG. 16B-B
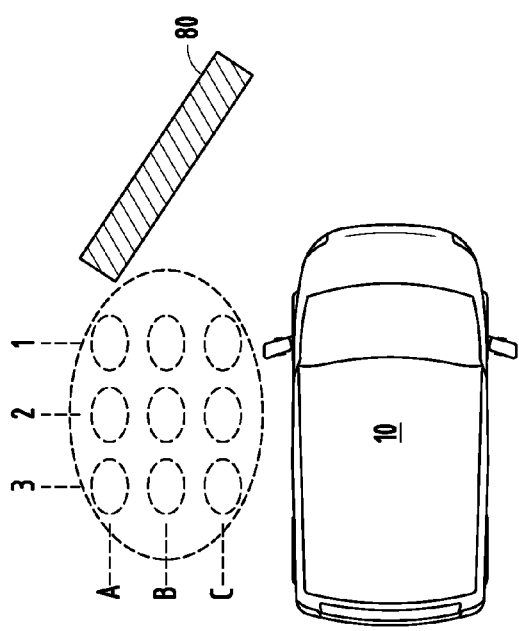
FIG. 16A
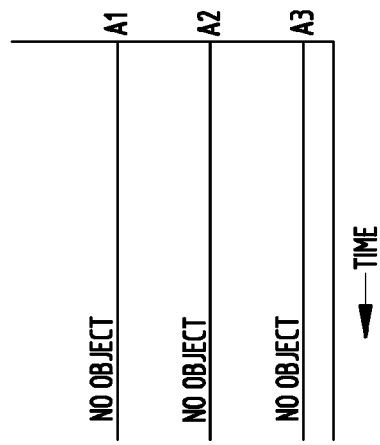
FIG. 16A-A

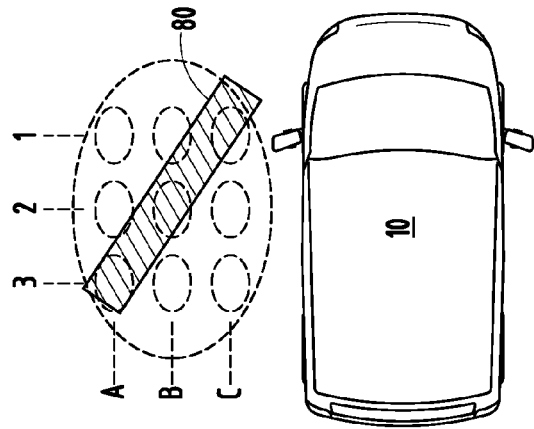
FIG. 16D
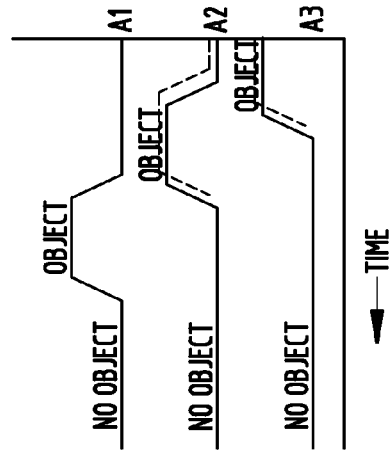
FIG. 16D-D
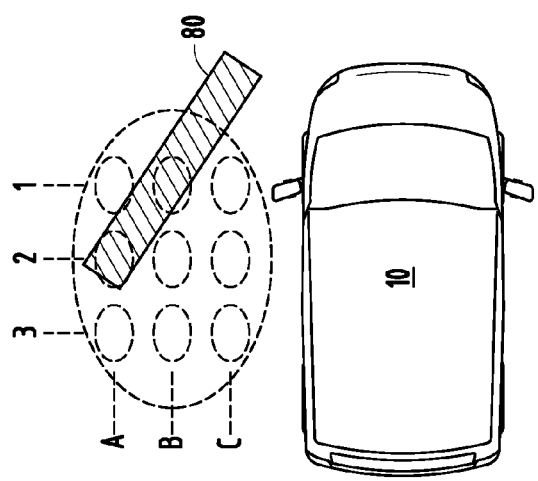
FIG. 16C
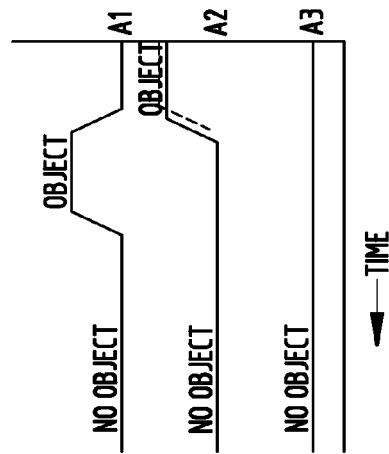
FIG. 16C-C

VEHICLE PRE-IMPACT SENSING SYSTEM HAVING SIGNAL MODULATION

CROSS-REFERENCE TO RELATED APPLICATION

This application claims priority under 35 U.S.C. §119(e) to U.S. Provisional Patent Application No. 61/130,236, filed on May 29, 2008, the entire disclosure of which is hereby incorporated herein by reference.

TECHNICAL FIELD

The present application generally relates to vehicle crash sensing and, more particularly, relates to a system and method of sensing an imminent collision of an object with a vehicle prior to impact.

BACKGROUND OF THE INVENTION

Automotive vehicles are commonly equipped with passenger restraint and crash mitigation devices such as seat belts, front air bags, side air bags and side curtains. These and other devices may be deployed in the event of a collision with the host vehicle to mitigate adverse effects to the vehicle and the occupants in the vehicle. With respect to activated devices, such as air bags and side curtain bags, these devices generally must be deployed quickly and in a timely fashion. Typically, these types of devices are deployed when sensors (e.g., accelerometers) mounted on the vehicle sense a severe impact with the vehicle.

In some vehicle driving situations, it is desirable to determine the onset of a collision, prior to impact of an object with the host vehicle. For example, vision systems employing cameras may be used to monitor the surrounding environment around the vehicle and the video images may be processed to determine if an object appears to be on a collision path with the vehicle. However, visions systems are generally very expensive and suffer a number of drawbacks.

An alternative approach is disclosed in U.S. Patent Application Publication No. 2009/0099736, assigned to the assignee of the present application. The approach set forth in the aforementioned patent application discloses a vehicle pre-impact sensing system that transmits a plurality of infrared (IR) beams and receives a plurality of beams within a plurality of curtains incrementally spaced from the host vehicle for sensing objects that may impact the side of the host vehicle. The aforementioned published patent application is hereby incorporated herein by reference.

It would be desirable to provide for an enhanced cost-effective system that senses a collision prior to impact with the host vehicle, particularly for use to detect side impact events.

SUMMARY OF THE INVENTION

According to one aspect of the present invention, a vehicle pre-impact sensing system is provided that includes an array of energy signal transmitters mounted on a vehicle for transmitting energy signals within multiple transmit zones space from the vehicle. The system further includes an array of receiver elements mounted on the vehicle for receiving the signals reflected from an object located in one or more multiple receive zones indicative of the object being in certain one or more receive zones. The system also includes a processor for processing the received reflected signals and determining range, location, speed and direction of the object. The processor further modulates the transmit energy signals and determines (e.g., measures) a difference in sensed signals for each zone with the transmitter turned on and turned off. The processor also determines whether the object is expected to impact the vehicle as a function of the determined range, location, speed and direction of the object, and generates an output indicative of a sensed pre-impact event.

According to another aspect of the present invention, a method of detecting an expected impact of an object with a vehicle is provided. The method includes the steps of transmitting signals within multiple transmit zones incrementally spaced from the vehicle, within one zone at a time, receiving signals reflected from an object located in the one or more multiple zones indicative of the object being in certain one or more received zones and processing the received reflected signals. The method also determines a location of the object, determines a range to the object, determines speed of the object, determines direction of the object and modulates the transmit energy signals array. The method also determines a difference in sensed signals for each zone with the transmitter turned on and off and determines whether the object is expected to impact the vehicle as a function of the determined range, location, speed and direction of the object, and generating an output indicative of the sensed pre-impact event.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 5 is an enlarged view of an integrated IR transmitter/receiver employed in the crash sensing system, according to one embodiment;

FIG. 11 illustrates a U-shaped IR transmit beam superimposed onto the front of an oncoming vehicle for use in detecting a vehicle fascia feature(s), according to one embodiment;

FIG. 12 illustrates an array of the U-shaped IR transmit beams shown in FIG. 11 superimposed onto an oncoming vehicle for detecting the vehicle fascia feature(s);

FIGS. 15A-15E illustrate the passing of a stationary object and terrain normalization to detect the object as stationary;

FIGS. 15A-A-15E-E are timing diagrams that illustrate normalization of a detected object as it passes through detection zones A1-A3 shown in FIGS. 15A-15E, respectively;

FIGS. 16A-16D illustrate the passing of an angled stationary object and the terrain normalization for detecting the stationary target;

FIGS. 16A-A-16D-D are timing diagrams illustrating terrain normalization as the angled object passes through the detection zones shown in FIGS. 16A-16D, respectively;

DESCRIPTION OF THE PREFERRED EMBODIMENTS

Figure 2:
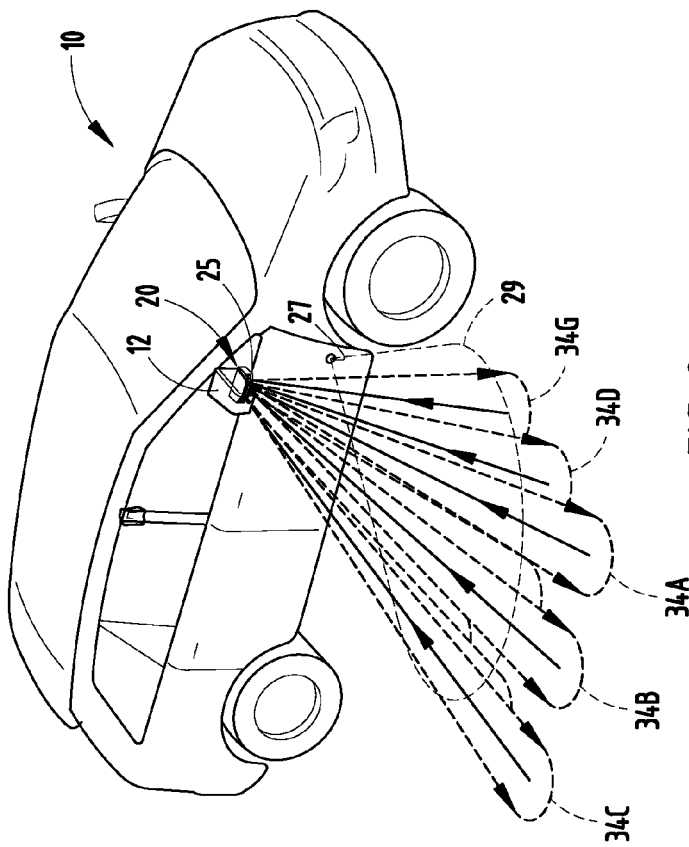
FIG. 2 is a side perspective view of the vehicle employing the pre-impact crash sensing system showing an array of receiver photodetection zones, according to one embodiment.

Referring to FIGS. 1-5, a vehicle pre-impact crash sensing system 20 is generally illustrated employed on a host vehicle 10, according to one embodiment. The crash sensing system 20 is shown and described herein configured to detect a pre-impact collision of an object (e.g., another vehicle) with the vehicle 10, particularly on one or both lateral sides of the vehicle 10. However, it should be appreciated that the crash sensing system 20 may be employed to detect a pre-impact event on any side of the vehicle 10, including one or both lateral sides, the front side and the rear side.

The host vehicle 10 is generally shown as an automotive wheeled vehicle having opposite lateral sides and exterior side view mirror housings 12 on opposite lateral sides. In the embodiment shown and described herein, the crash sensing system 20 generally includes an integrated infrared (IR) transmitter/receiver 25 shown mounted generally in one of the mirror housings 12 of the vehicle 10, at a position sufficient to detect objects located adjacent to the corresponding lateral side of the vehicle 10. While lateral crash sensing is shown and described herein for sensing a collision on one side of the host vehicle 10, it should be appreciated that the crash sensing may also be employed on the opposite lateral side of the vehicle. Further, while the transmitter/receiver 25 is shown mounted in the mirror housing 12, it should be appreciated that the integrated transmitter/receiver array 25 may be located at other locations on the vehicle 10 and positioned to detect one or more objects in the desired vicinity of the vehicle 10.

Figure 1:
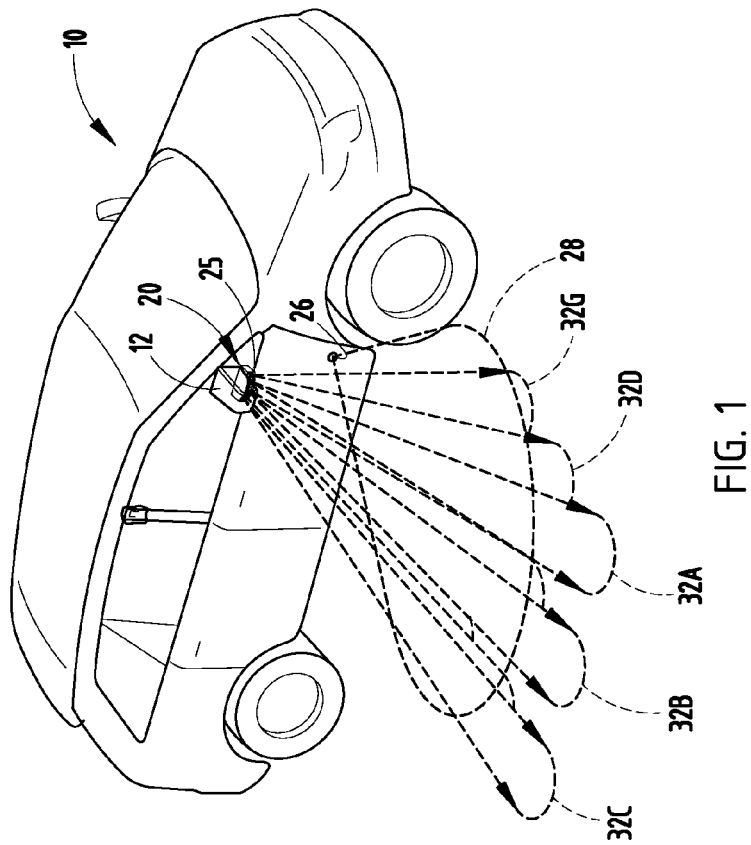
FIG. 1 is a side perspective view of a vehicle employing a pre-impact crash sensing system illustrating an array of infrared (IR) transmit zones, according to one embodiment.
Figure 3:
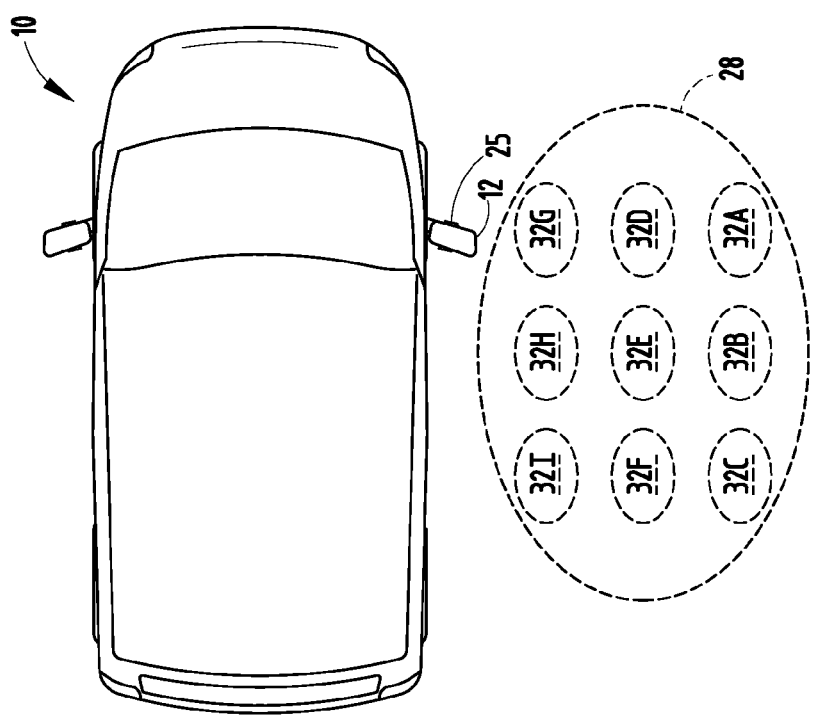
FIG. 3 is a top view of the vehicle further illustrating the IR transmit zones employed in the crash sensing system of FIG. 1.

The IR transmitter/receiver 25 includes a plurality of IR transmitters (22A-22I) and a plurality of IR receivers 24A-24I, as shown in FIG. 5. As seen in FIGS. 1 and 3, the IR transmitters 22A-22I transmit infrared (IR) energy signals within designated transmit beam patterns 32A-32I in a three-by-three (3×3) array spaced from the lateral side of the host vehicle 10, according to one embodiment. The infrared transmitter array 25 has a plurality (e.g., nine) of infrared transmitters 22A-22I for transmitting infrared radiation signals within designated corresponding transmit zones 32A-32I. The transmitter array is activated to sequentially transmit infrared radiation signals in one zone at a time, such as zone 32A, and then switches sequentially to the next zone, such as zone 32B, and then to zone 32C, and continues through the entire array to zone 32I, and cyclically repeats the process at a high rate of speed, e.g., less than three milliseconds per zone. Alternately, multiple transmit zones could be illuminated simultaneously. In the embodiment shown, the IR transmit zones 32A-32I are oriented in a three-by-three (3×3) array having three rows and three columns, each zone having a generally conical shape extending from the transmitter/receiver 25 shown located in the mirror housing 12 and oriented toward the roadway to the lateral side of the host vehicle 10 such that the row of zones 32A-32C is spaced further away from the host vehicle 10 as compared to the row of zones 32D-32F and row of zones 32G-32I. Each IR transmit zone 32A-32I has a generally cone shape beam with a circular cross section which appears more as an elliptical shape as it impinges at an angle on the ground on the adjacent roadside. Each IR transmit zone 32A-32I has a size sufficient to cover the intended detection zone at the lateral side of the host vehicle 10 and may be spaced from the adjacent zones by a predetermined angle, according to one embodiment. According to another embodiment, the IR transmit zones 32A-32I may overlap each other, thereby offering intermediary zones that can be further processed.

Figure 4:
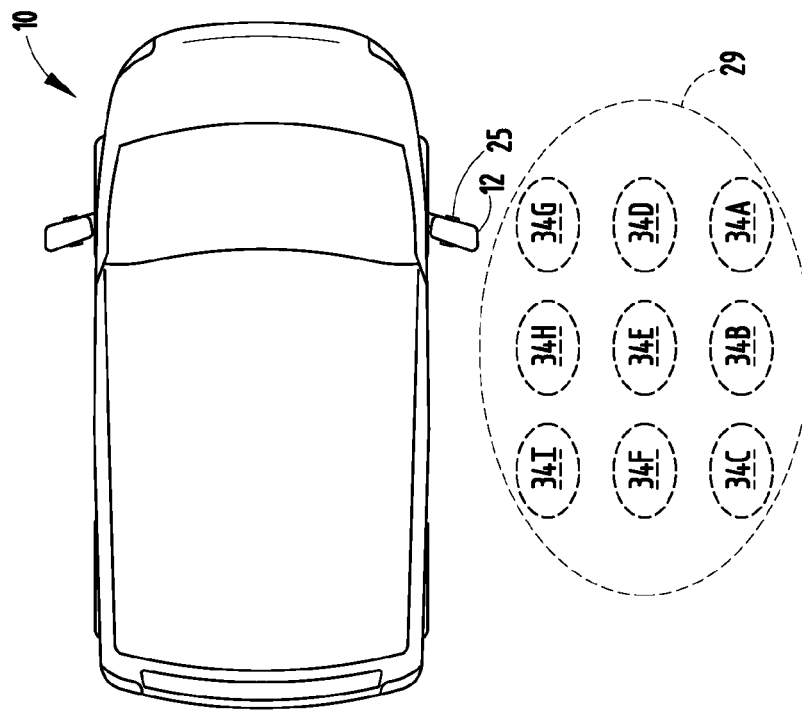
FIG. 4 is a top view of the vehicle further illustrating the IR photoreceiver zones employed in the crash sensing system shown in FIG. 2.

The crash sensing system 20 also includes a receiver array having a plurality of photosensitive receiver elements 24A-24I as shown in FIG. 5. In one embodiment, the receiver elements 24A-24I receive and detects light intensity including reflected infrared radiation signals within corresponding IR receive zones 34A-34I as shown in FIGS. 2 and 4. The IR receivers 24A-24I essentially receive light including infrared radiation signals reflected from one or more objects within the corresponding IR receive zones 34A-34I and converts the detected light intensity to a frequency output. In one embodiment, the receive zones 34A-34I are arranged in a three-by-three (3×3) array having three columns and three rows that are located such as to substantially align with the corresponding three-by-three (3×3) array of IR transmit zones 32A-32I.

Figure 8:
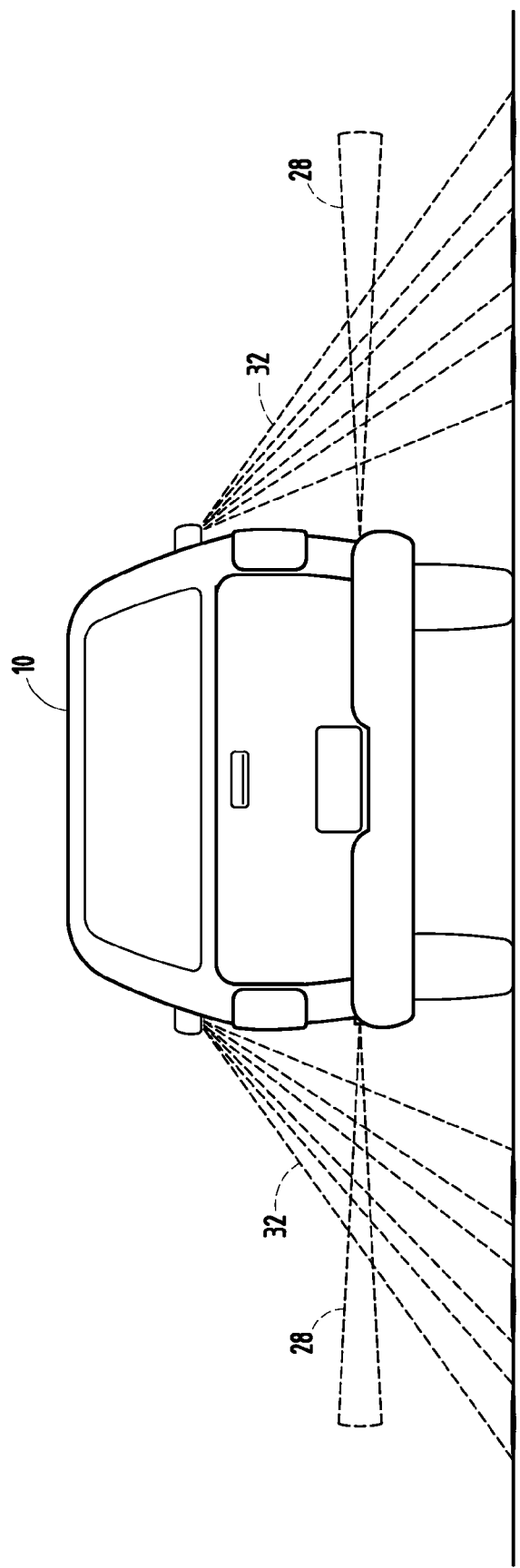
FIG. 8 is a rear view of the vehicle showing the IR transmit zones including an additional elevated horizontal IR transmit zone, according to one embodiment.

In addition, the vehicle 10 is shown in FIG. 1 having an additional or tenth IR transmitter 26 shown illuminating a horizontal beam at an elevation where an oncoming vehicle bumper or grille would be expected to be located. The additional IR transmitter 26 transmits a substantially horizontal IR calibration beam outward from the lateral side direction of the host vehicle 10 as shown in FIG. 8. In the embodiment shown, IR transmitter 26 is located in a passenger door of the host vehicle 10 at a height similar to or the same as the elevation of the beam 28 relative to the ground. It should be appreciated that the transmitter 26 may be located elsewhere on host vehicle 10 such as in the front quarter panel or the front or rear bumpers of host vehicle 10. The additional IR transmit beam 28 provides a horizontal calibration IR beam which is illuminated by itself in the timing sequence of illuminating the nine IR transmitters 22A-22I. By illuminating the additional IR transmitter 26, the IR receivers 24A-24I may detect light intensity including infrared radiation reflected from objects in the corresponding zones 34A-34I, particularly for object features located at the elevation of beam 28 such as a vehicle bumper, a vehicle grille or fascia or other features expected to be detected at that elevation. By providing the extra horizontal IR transmit beam 28, triangulation of the calibration beam with the other nine scanned IR beams 32A-32I allows ranging and a measure of the reflection coefficient of the surface of a target object. As such, enhanced range information may be acquired, according to one embodiment.

Further, the host vehicle 10 is shown in FIG. 2 having an optional additional IR photoreceiver 27 shown located at the same or in close proximity to IR transmitter 26 for receiving reflected signals within a horizontal beam at an elevation where an oncoming vehicle bumper or grille would be expected to be located. The IR receiver 27 receive light signals including reflected IR signals within receive beam 29 and generates a frequency output as a function of the detected light amplitude. It should be appreciated that with the additional IR transmitter 26 turned on, either the additional IR photoreceiver 27 or the individual IR photoreceivers 24A-24I may be employed to detect the presence of an object within the horizontal beams at the elevation where an oncoming vehicle bumper or grille is expected which enables enhanced range estimation based on triangulation of the received signals.

In operation, the array of IR transmitters 22A-22I transmits infrared radiation signals within the corresponding IR transmit zones 32A-32I, one zone at a time, according to one embodiment, resulting in the transmission of sequential IR signals to the transmit zones, while the receiver array 24A-24I receives light energy including reflected infrared radiation signals from objects located within the corresponding IR receive zones 34A-34I. The detected light signals are output as frequency signals which are then processed by a processor. By knowing which one of the IR transmit zones 32A-32I is illuminated with infrared radiation at a given point in time, the location and range of the detected object can be determined. As an object moves, the progression of the object through multiple zones can be monitored to determine speed and direction of the object, such that a processor may determine whether a pre-impact event of the object with the host vehicle 10 is detected. In addition to the sequential illumination of IR transmitters 22A-22I, the system 20 may also activate the additional IR transmitter 26 as part of the sequence to detect objects within the illuminated horizontal IR calibration beam 28. The sequence of illumination may include successive activation of the nine IR transmitters 22A-22I, the activation of the tenth IR transmitter 26, then all IR transmitters turned off, and then repeat the cycle.

With particular reference to FIG. 5, the integrated IR transmitter/receiver 25 is illustrated, according to one embodiment. The IR transmitter/receiver 25 is shown generally having a housing 60 containing an array of nine IR LEDs 22A-22I mounted onto the top side of a circuit board 62. The IR LEDs 22A-22I may be disposed behind respective beam-forming optics, which may include reflecting (e.g., parabolic reflector) and/or refracting optical elements or an aperture for defining the conical-shaped beam pattern. It should be appreciated that the IR transmitter array 22A-22I may employ any of a number of signal transmitting elements for illuminating multiple transmit zones, and may be configured in any of a number of shaped and sized beam patterns. According to one example, the IR LEDs 22A-22I may employs a central wavelength of about 850 nanometers. One example of a commercially available IR LED is available from OSRAM Opto Semiconductors Inc., sold under the brand name Golden Dragon.

The IR transmitter/receiver 25 is shown employing nine photodetectors 24A-24I which serve as photosensitive receivers and are shown mounted on the bottom side of the circuit board 62. Photodetectors 24A-24I may generally be placed behind corresponding receiving lenses and/or receiving reflectors (e.g., parabolic reflectors). The receiving lenses may include reflecting and/or refracting optical elements that focus the reflected infrared radiation received from the corresponding IR receive zones 34A-34I onto the photodetectors 24A-24I, respectively. The receiver array may employ any number of a plurality of receiver elements for receiving reflected IR signals from objects within the corresponding number of receive zones 24A-24I and may each be configured in a cone shape or other shapes and sizes. One example of a photodetector is a light-to-frequency converter commercially available from Texas Advanced Optoelectronic Solutions (TAOS). The light-to-frequency converter provides a frequency output (Hz) as a function of the amplitude of the detected light radiation.

Figure 6:
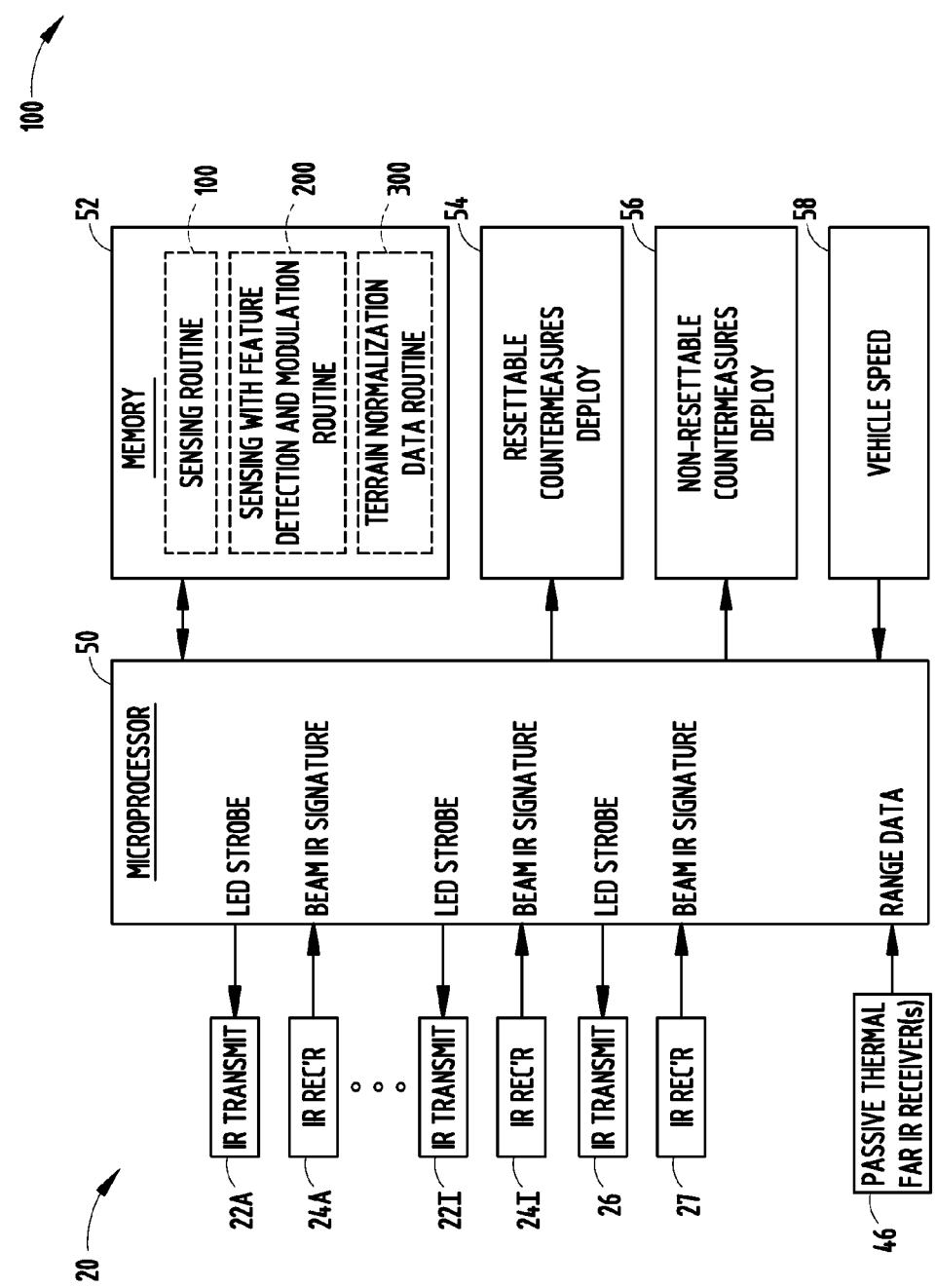
FIG. 6 is a block diagram illustrating the pre-impact crash sensing system, according to one embodiment.

Referring to FIG. 6, the crash sensing system 20 is further illustrated employing a microprocessor 50 having various inputs and outputs. The microprocessor 50 is shown providing outputs to the nine IR transmitters 22A-22I and the tenth IR transmitter 26. The microprocessor 50 outputs LED strobe signals to the IR LEDs 22A-22I and 26 to activate the IR LEDs in a cyclical pattern. Signals indicating light and reflected infrared radiation received by each of the receiver elements 24A-24I are input to the microprocessor 50. In the embodiment disclosed, the receiver elements 24A-24I provide frequency signals input to the microprocessor 50 in the form of a beam IR signature. The beam IR signature includes frequency (in hertz) representing the amplitude of the photo or light energy detected by its irradiance on the receiver from within a given detection zone.

In addition, the microprocessor 50 receives an input from a passive thermal far IR receiver 46. The passive thermal far IR receiver 46 detects emitted radiation within a relatively large area and serves as a safing input that may be logically ANDed with a processor generated output signal to provide risk mitigation for high target certainty. Alternately, the crash sensing system 20 may employ radar or an ultrasonic transducer as the safing input. Further safing inputs may include a steering wheel angular rate, yaw, external lateral slip, lateral acceleration and lateral velocity signals, amongst other possible safing inputs.

The crash sensing system 20 further includes memory 52, including volatile and/or non-volatile memory, which may be in the form of random access memory (RAM), electrically erasable programmable read-only memory (EEPROM) or other memory storage medium. Stored within the memory 52 is a sensing routine 100 for processing the sensed data and determining a pre-impact event as described herein. Also stored in memory 52 and executed by microprocessor 50 is a routine 200 detecting vehicle features and determining a pre-impact event and a routine 300 performing terrain normalization and determining a pre-impact event.

Additionally, the microprocessor 50 provides a resettable countermeasure deploy output signal 54 and a non-resettable countermeasure deploy output signal 56. The countermeasure deploy output signals 54 and 56 may be employed to mitigate the effects of an anticipated collision. Examples of countermeasure deploy activity may include deploying a pretensioner for one or more seat belts, deploying one or more air bags and/or side air bag curtains, controlling an active suspension or other vehicle dynamics adjustment, or further may activate other countermeasures on board the host vehicle 10. These are other deployments may be initiated early on, even prior to an actual impact. Further, the microprocessor 50 receives vehicle speed 58 which may be a measured vehicle speed on a vehicle speed estimate. Vehicle speed 58 may be employed to determine whether or not a lateral impact with an object is expected and is further employed for terrain normalization to determine whether or not an object is stationary despite its shape and orientation.

Figure 7:
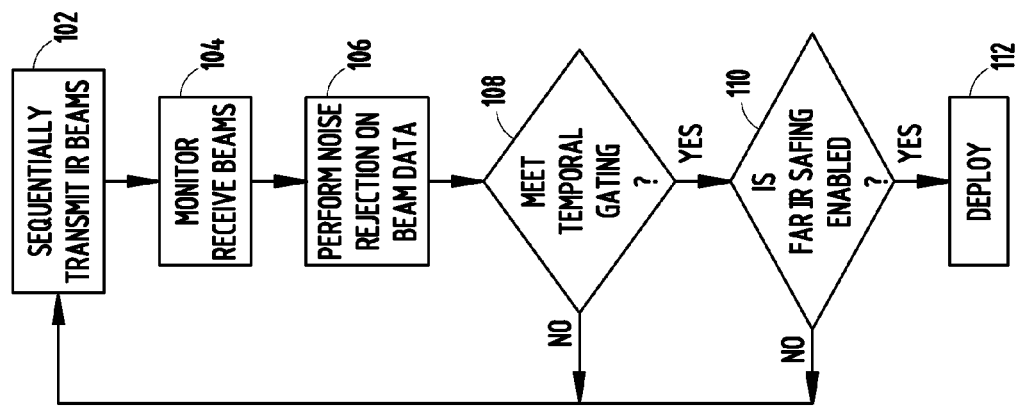
FIG. 7 is a flow diagram illustrating a routine for sensing a pre-impact collision of an object with the vehicle, according to one embodiment.

The sensing routine 100 is illustrated in FIG. 7 for sensing an anticipated near impact event of an object with the host vehicle. Routine 100 begins at step 102 to sequentially transmit IR beams, and the proceeds to step 104 to monitor received photosensitive beams within the array of coverage zones. This occurs by sequentially applying IR radiation within each of the transmit beams and receiving light energy including reflected IR signals from the receive zones. Next, routine 100 performs noise rejection on the beam data that is received. In decision step 108, routine 100 determines if the temporal gating has been met and, if not, returns to step 102. The temporal gating bracketing requirements may take into consideration the path, trajectory and rate of the object, the number of pixels of area, the inferred mass/volume/area, the illumination consistency, and angular beam spacing consistency.

According to one embodiment, temporal gating requirements are determined based on comparison of an object's perceived motion (detection from one contiguous coverage zone to another) across the coverage zones to the expected relative speed of potential collision objects of interest (e.g., an automotive vehicle moving at a closing speed of 10 to 65 kilometers per hour (kph) or 6 to 40 miles per hour (mph) to a host vehicle's lateral side). The "range rate" of distance traveled per unit time of a potential collision object can be determined by the detection assessment of contiguous coverage zones for range rates consistent with an expected subject vehicle's closing speed (i.e., if an object is detected passing through the coverage zones at a rate of 1 observation zone per 70 milliseconds and each coverage zone is 0.3 meters in diameter perpendicular to the host vehicle's lateral side, then the closing speed or range rate is approximately 4 meters per second, and is equivalent to approximately 15 kph or 10 mph). Objects moving at range rates slower or faster than the expected range rate boundary through the coverage zones would not pass the temporal gating requirement.

Additional assessment can be made based on the quality of the received signal of a potential object as it passes through the coverage zones. If the amplitude of the detected signal varies substantially from one contiguous coverage zone to another (even if all signals are above a threshold value), it could indicate an off-axis collision trajectory or perhaps an object with a mass not consistent with a vehicle. The signal fidelity and consistency through the contiguous coverage zones can be used to verify a potential vehicle collision.

If the temporal gating has been met, routine 100 then proceeds to decision step 110 to determine if the far IR safing has been enabled and, if not, returns to step 102. If the safing has been enabled, routine 100 proceeds to deploy an output signal indicative of a sensed pre-impact event in step 112. The output signal may be employed to activate deployment of one or more countermeasures.

The crash sensing system 20 creates a three-dimensional space extending from the lateral side of the host vehicle 10 by way of an array of high speed sequentially illuminated and scanned infrared light signals provided in dedicated coverage zones directed to the lateral side of the host vehicle 10. Objects which appear within the coverage zones are scanned, and their location, range, speed, and direction are determined. In addition, the size of the object may be calculated. Further, the shape of the object and one or more features such as reflectivity present on the object may further be further determined. It should be appreciated that feature identification, such as may be achieved by monitoring reflectivity, such as that due to color, and other variations, may be detected and an enhanced range may be determined. The processor 50 processes the information including location, range, speed and direction of the object in addition to the host vehicle speed, and determines whether or not a detected object is expected to impact the side of the host vehicle 10. The processor 50 processes the location of the detected object, range to the detected object, speed of the detected object, and direction of the detected object in relation to the host vehicle 10 and the speed of the host vehicle 10. Additionally, the processor 50 may further process the size and shape of the object in order to determine whether the object will likely collide with the host vehicle 10 and, whether the object is of a sufficient size to be a concern upon impact with the host vehicle 10. If the object is determined to be sufficiently small in size or moving at a sufficiently slow rate, the object may be disregarded as a potential crash threat, whereas a large object moving at a sufficiently high rate of speed toward the host vehicle 10 may be considered a crash threat.

While the crash sensing system 20 is described herein in connection with an integrated IR transmitter/receiver having nine IR transmitters and nine photosensitive receivers each arranged in an array of three-by-three (3×3), and the addition of an additional IR transmitter 26 and an optional photosensitive receiver 27, it should be appreciated that other infrared transmit and receive configurations may be employed without departing from the spirit of the present invention. It should further be appreciated that other shapes and sizes of coverage zones for transmitting IR radiation and receiving photosensitive energy radiation may be employed and that the transmitters and/or receivers may be located at various locations on board the host vehicle 10. U.S. Patent Application Publication No. 2009/0099736, entitled "VEHICLE PRE-IMPACT SENSING SYSTEM AND METHOD" discloses various configurations of IR transmitter and receiver arrays for detecting objects to a lateral side of a vehicle 10. The aforementioned U.S. Patent Application Publication is hereby incorporated herein by reference. It should be further be appreciated that variations in segmented lens or reflector designs may be utilized to provide design flexibility for customized coverage zones. One example of a segmented lens is disclosed in U.S. Patent Application Publication No. 2008/0245952, filed on Apr. 3, 2007 and entitled "SYNCHRONOUS IMAGING USING SEGMENTED ILLUMINATION," the entire disclosure of which is hereby incorporated herein by reference.

It should be appreciated that a complete field image encompassing all the coverage zones may be generated every scan of the entire array of the covered volume. By comparing successively acquired photosensed images, the size, shape, location, range and trajectory of an incoming object can be determined. To aid in the estimation of the range (distance) of the object from the system 20, and hence the host vehicle 10, the additional IR illuminator 26 and optional receiver 27 may be employed along with triangulation. By employing triangulation, the presence of an object in the designated zones is compared to the additional IR transmit zone 28 such that the range (distance) can be determined. Additionally, the reflection power of the signal received can be used to enhance the range estimate and thereby enhance the detection of a pre-crash event.

The vehicle pre-crash impact sensing system 20 employs a feature detection scheme that identifies certain features of an object vehicle, particularly an object vehicle moving laterally toward the host vehicle 10, to provide enhanced vehicle discrimination. According to a first embodiment of the feature identification scheme, the sensing system 20 employs the horizontally illuminated IR calibration beam 28 in conjunction with the IR transmit beams 32A-32I in an attempt to identify a known feature such as bumper and/or grille of a laterally oncoming vehicle. In doing so, the horizontal calibration IR beam transmitter 26 is multiplexed between the main IR beams 32A-32I to allow enhanced range calibration. By multiplexing the additional IR illumination calibration beam 28 with the standard nine IR transmit zones 32A-32I, the range of the reflected object can be better estimated. Additionally, by employing a calibration chart, the reflection coefficient of the surface of the object detected may be used for increased accuracy range estimate, and thus improved risk assessment for proper side air bag deployment or other countermeasure. The optional tenth photosensitive receiver 27 may be employed to provide received photosensitive signals within zone 29 to further enhance the process.

According to another embodiment, enhanced oncoming laterally moving vehicle discrimination can be achieved by employing one or more scanned beams in a generally U-shape configuration which is generally configured to encompass the shape of a common vehicle front, particularly the fascia. Multiple U-shaped patterns extending from a distant focus to larger and nearby may be created with the physical structure of the beam hardware (e.g., via the optical design). Alternately, the beam pattern can be created in software if the number of beams fully covers the oncoming laterally moving vehicle's trajectory path from far to nearby. The U-shaped beam forms may have ends of about three feet by three feet which focuses on the oncoming laterally moving vehicle's headlamps/signal markers and a center connecting line of about a two foot height which receives the oncoming laterally moving vehicle's grille chrome. Accordingly, the pre-impact sensing system applies vehicle fascia detection with vehicle front grille shaped optical regions for improved detection of approaching vehicles. Nine overlapping regions may allow target tracking and relative ranging, and the geometry can apply to either the IR illumination or light receiver shape or possibly both the transmit and receiver shapes.

According to a further embodiment, enhanced oncoming laterally moving vehicle discrimination may be achieved by detecting the differential spectral return of highly reflective vehicle surfaces, such as signal markers, headlamps, fog lamps, license plates, chrome and other features typical of vehicle front ends. Additionally, background light illumination levels may also be used to measure the highly reflective vehicle elements. Additionally, the system 20 may be used to detect the headlamp on status of the oncoming vehicle further, thereby allowing discrimination of their presence as well as any possible pulse width modulation (PWM). LED headlamps which are also pulsed may be sensed and used as an additional discrimination element. The geometry of the spectral objects on an inbound oncoming laterally moving vehicle may also aid in the discrimination risk assessment.

Figure 9A:
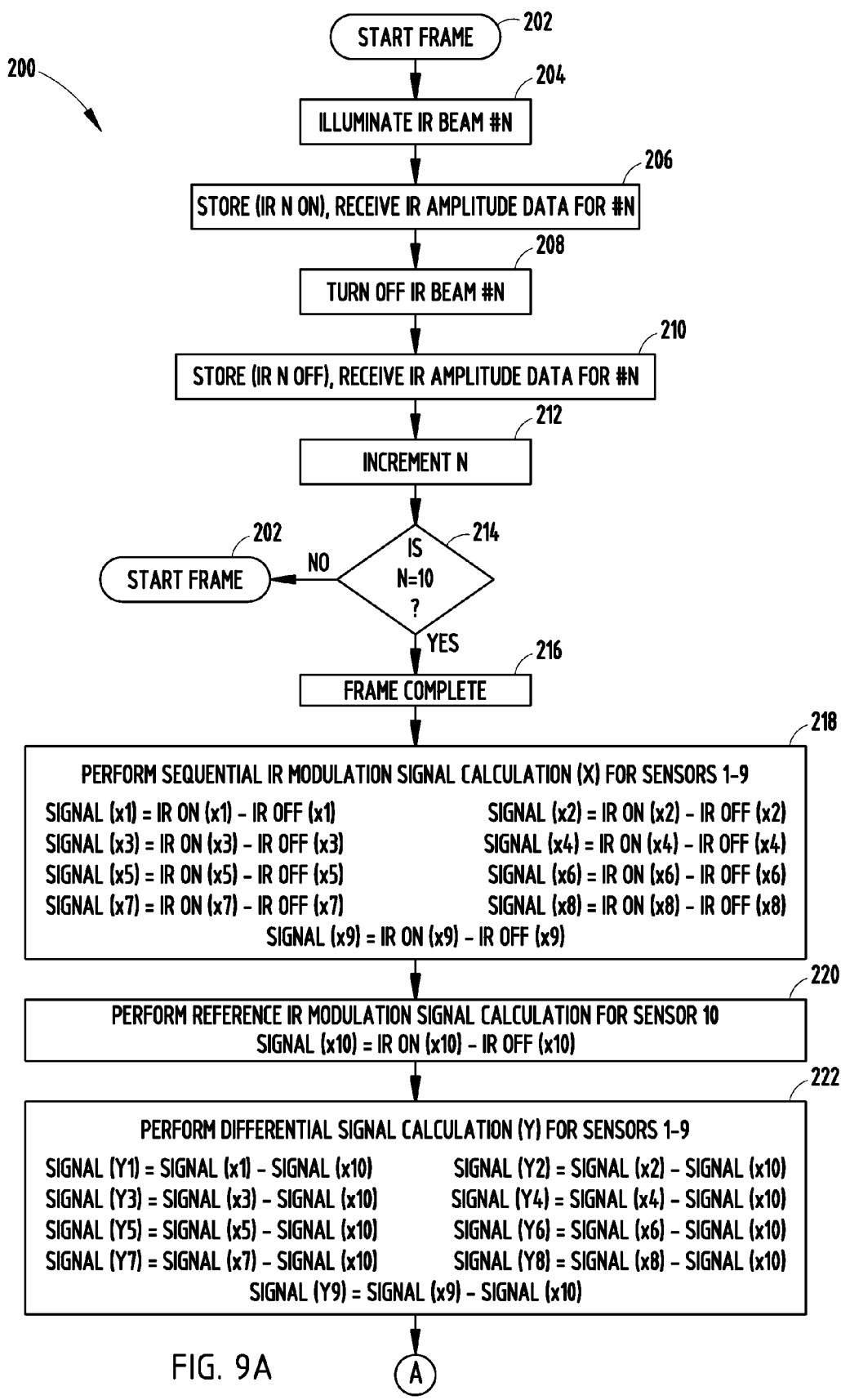
FIGS. 9A and 9B is a flow diagram illustrating a routine for sensing a vehicle feature to update a range estimate and a side impact crash, according to one embodiment.
Figure 9B:
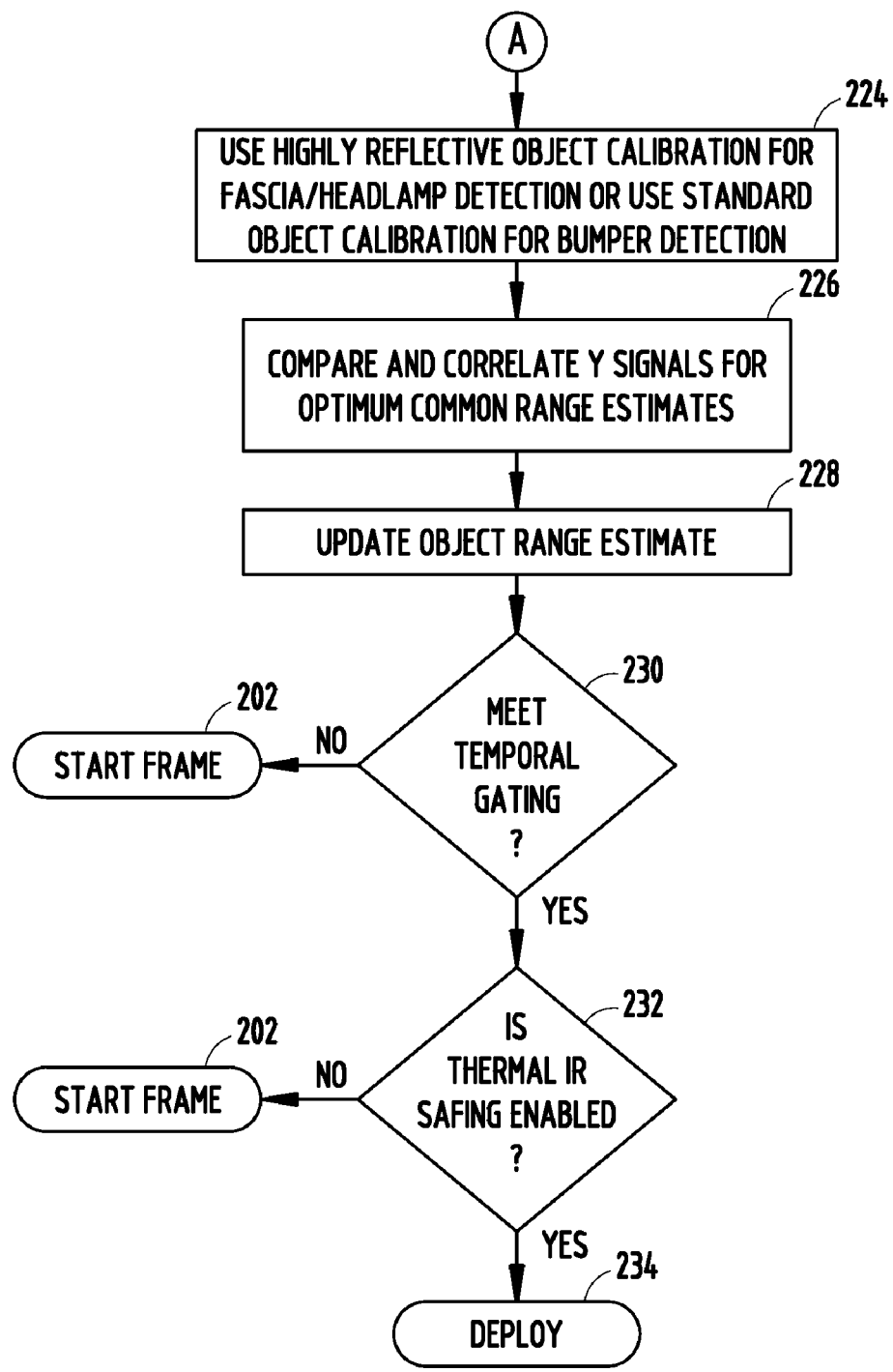

Referring now to FIG. 9, a routine 200 is illustrated for sensing a pre-crash event of a vehicle to deploy one or more devices and includes steps of implementing the various aforementioned embodiments of the vehicle feature identification to advantageously provide updated object range estimates. Routine 200 begins at step 202 and proceeds to step 204 to illuminate the IR beam N, wherein N is the number of IR transmit beams which are sequentially activated. Next, in step 206, routine 200 stores the IR transmitter that is turned on, and receives the IR amplitude data for the $N^{th}$ receive zone. It should be appreciated that the transmit beams are turned on one beam at a time, according to one embodiment, and that the light energy including IR energy reflected from objects within each zone is detected by receivers covering the corresponding receive zones. In step 208, beam N is turned off as part of this process, and at step 210, the IR off is stored and the amplitude data of received light energy for beam N is stored with the IR off. Next, N is incremented to the next successive zone of coverage. At decision step 214, routine 200 determines if N has reached a value of ten which is indicative of the number of IR transmitters and, if not, repeats at step 202. Once a complete cycle of all ten zones has been completed with N equal to ten (10), routine 200 proceeds to step 216 to indicate that a frame is complete, such that the received energy data is mapped out for the coverage zones.

Once a frame is complete, routine 200 proceeds to step 218 to perform a sequential IR modulation signal calculation for each of the IR sensors, shown as sensors 1-9 indicative of the outputs of the respective photodetectors 24A-24I. Step 218 essentially performs a sequential IR modulation signal calculation by taking the difference of the sensed photo signal while the infrared transmitter is turned on and then when the infrared transmitter is turned off for each coverage zone. As such, for zone 1, a signal (X1) is determined based on the difference of the receive signal with the IR on and the IR off, signal (X2) is indicative of the receive signal with the IR on minus the IR off, etc. By turning the IR transmitter array on and off at a frequency such as three hundred (300) hertz, the emitted IR beams are essentially modulated at the switching or modulation frequency. The difference between the received IR energy signals when the IR transmitter is turned on and when the same IR transmitter is turned off produces a ripple signal as described herein. The sequential IR modulation signal calculation is performed for each of the nine zones 1-9 to generate corresponding ripple signals to remove or get rid of the overall background noise.

For an embodiment that employs the tenth IR receiver 27, routine 200 performs step 220 which processes the output of the tenth IR receiver 27 to acquire enhanced signal to noise ratio. Step 220 is an optional step that performs a reference IR modulation signal calculation for the tenth receiving sensor, also referred to as receiver 27. In doing so, signal (X10) is generated as a function of the IR on minus the IR off for the tenth coverage zone.

Routine 200 then proceeds to step 222 to perform a differential signal calculation (Y) for each of sensors 1-9 to acquire an enhanced differential signal by eliminating or removing background noise. The differential signal calculation involves calculating the difference between signal X1 and signal X10, to the extent a tenth transmitter is employed. Similarly, the signal Y2 is acquired by taking the difference between signal X2 and signal X10. Similarly, each of zones 3-9 involves subtracting the signal X10 from the corresponding received signal for that zone to provide respective ripple signals for each zone.

Following step 222, routine 200 proceeds to step 224 to use an object calibration for vehicle feature identification. According to one embodiment, routine 200 uses a standard object calibration for a bumper detection to detect the bumper or similar feature(s) on a lateral oncoming vehicle. According to another embodiment, routine 200 employs a highly reflective object calibration for fascia and headlamp detection. It should be appreciated that the object calibration for bumper detection and reflective object calibration for fascia/headlamp detection may be achieved by use of one or more calibration charts or look-up tables, such as the exemplary calibration chart shown in FIG. 10.

Figure 10:
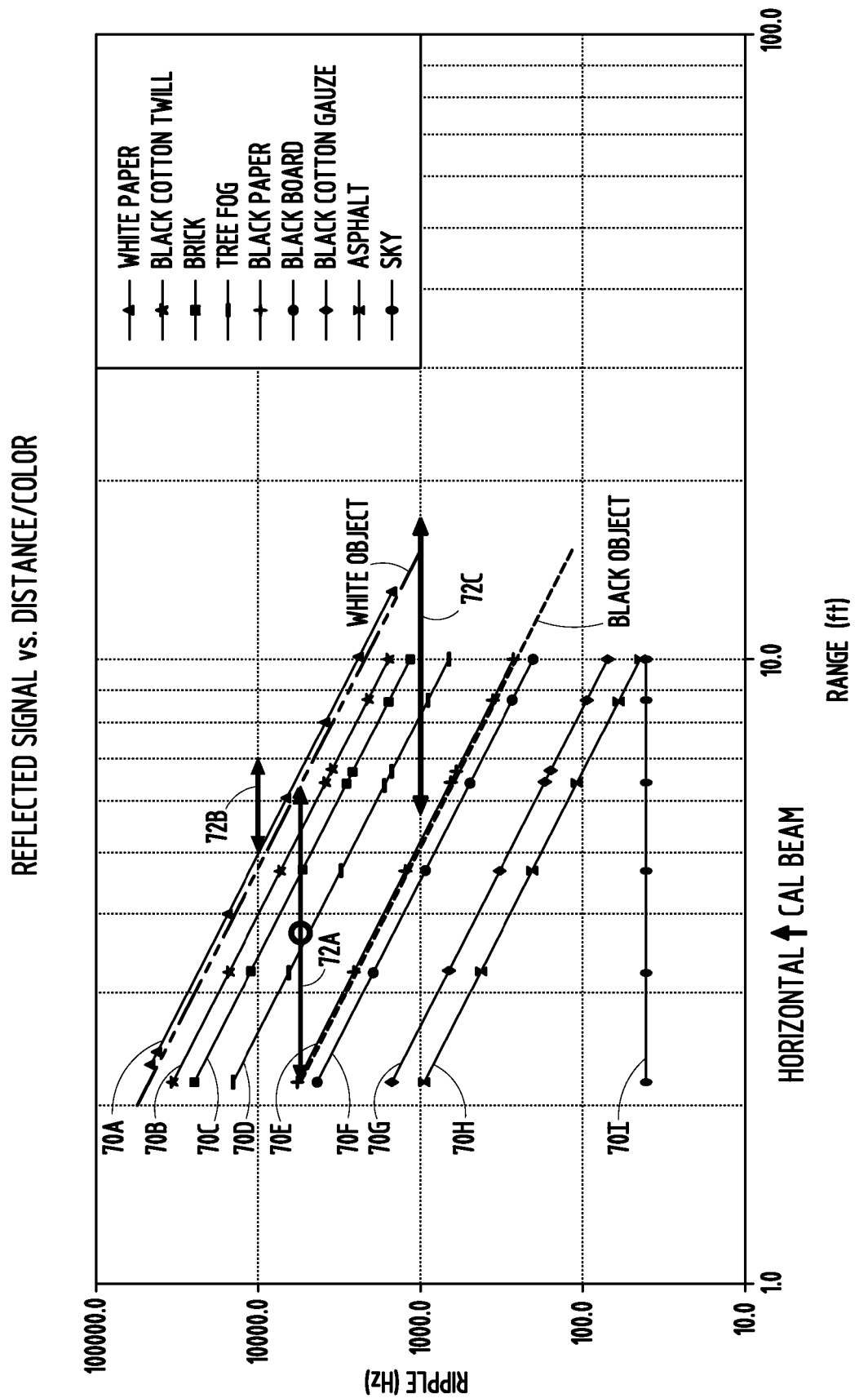
FIG. 10 is a calibration chart illustrating reflected ripple signals as a function of distance for various identified objects, according to one example.

The calibration chart shown in FIG. 10 essentially maps a plurality of different sample objects having various features such as shapes, colors, materials (textures) and reflectivity as a function of the ripple signal in hertz versus range in feet. It should be appreciated that the IR receiver photodetectors each provide an output frequency dependent upon the photosensitive detection. The frequency is generally equal to the amplitude (A) of the ripple signal divided by the distance (d) squared (frequency=$A/d^2$). The ripple signals shown are the reduced noise Y signals generated at step 222. The various targets that are shown by lines or curves 70A-70H in the example calibration table of FIG. 10 include arbitrary selected materials such as a white paper, black cotton twill, brick, tree and fog, black paper, black board, black cotton gauze, asphalt, and a typical sky scenario. It should be appreciated that these and other targets or selected materials may be mapped out in a given calibration table for use with routine 200.

Next, in step 226, routine 200 compares the differential signal calculations Y to determine the highest correlation for a detected geometry. In doing so, routine 200 uses a selected calibration map to determine the optimum range estimate based on a common range from the nine received ripple signals. In step 228, routine 200 updates the object range estimate based upon the identified feature(s). Accordingly, it should be appreciated that by identifying an anticipated feature for the front end of a lateral approaching vehicle, such as the vehicle bumper, fascia and/or headlamp, enhanced object range may be estimated for use in the pre-crash sensing system 20.

Following the step of updating the object range estimate, routine 200 proceeds to decision step 230 to determine if the temporal gating has been met, and if not, returns to step 202. The temporal gating step 230 may be the same or similar temporal gating step described in connection with step 108 of routine 100. If the temporal gating has been met, routine 200 proceeds to decision step 232 to see if the thermal IR safing has been enabled and, if so, deploys one or more devices in step 234. If the thermal IR safing is not enabled, routine 200 returns to step 202. The thermal safing step 232 may be the same or similar to the safing logic described in connection with step 110 of routine 100.

Accordingly, routine 200 advantageously provides for an enhanced object range estimate based on the detected type of feature of a vehicle that is oncoming in the lateral direction. By detecting one or more features of the detected object, routine 200 advantageously looks up the calibration data and provides an updated range estimate which advantageously enhances the determination of whether a laterally approaching vehicle, such as an automobile, is expected to collide with the host vehicle 10.

Referring to FIG. 11, the U-shaped geometry for a single beam geometry transmit beam 32 is shown superimposed onto the front side fascia portion of the front side of a vehicle, which represents a potential oncoming laterally moving vehicle. The U-shaped transmit beam 32 may be broadcast as an infrared beam by a single IR transmitter, according to one embodiment. According to one embodiment, multiple U-shaped IR transmit beams 32A-32I are transmit as shown in FIG. 12, each having a generally U-shape and covering separate zones, which overlap each other. The multiple U-shape beams may extend from a distant focus to larger and nearby and could be created with the physical structure of the beam hardware (e.g., via the optical design). Alternately, such a beam pattern could be created in software if the number of beams fully covers the oncoming laterally moving vehicle's trajectory path from a far distance to a nearby distance. According to one example, the U-shaped beam form may have ends of about three feet by three feet at distance of about six feet, which focuses on the oncoming laterally moving vehicle's headlamp/signal markers and a center connecting line of about a two foot height which receives the oncoming laterally moving vehicle's grille chrome. While an array of U-shape transmit beams is shown and described herein, it should be appreciated that the geometry of the light receivers may be shaped in a U-shape instead or in addition to the transmit beams.

By processing the U-shaped beam and the IR signals received therefrom, the trajectory and range of the oncoming vehicle object may be better determined. In an alternate embodiment, the U-shaped beams may be shaped in an oval shape for simplicity, or another shape that picks up the fascia and similar features of the front end of the oncoming vehicle. It should be appreciated that as the IR transmit beams cross horizontally the front fascia of an oncoming front end of a vehicle, a resultant ripple signal is generated. The ripple signal is the difference in detected energy signal when the IR is turned on and when the IR is turned off. It should be appreciated that for a high reflectance feature, such as the headlamps and signal markers, a higher ripple signal is achieved having a higher frequency. Typically, the center grille area of a front end of an oncoming vehicle is mainly paint which has a lower reflective coefficient versus the reflected components of the headlamps and the signal markers. The ripple signal signature can be processed to determine the presence of a likely vehicle fascia or portion thereof including the headlamps and signal markers of the front end of an oncoming vehicle.

The pre-crash sensing system 10 further employs a modulation technique to nullify background ambient light conditions and better enhance the estimated target range. The extreme lighting variation from darkness to full sunlight presents many challenges to an object detection system. These and other deficiencies can be overcome by turning the IR transmit array on and off at a high frequency of three hundred (300) hertz, for example, or otherwise provide amplitude modulation of the IR light source with a square wave or a sine wave so as to nullify the background ambient light conditions and better enhance the estimate of target range.

Extreme lighting variations and other deficiencies may be overcome by a modulation technique which measures a scene with ambient lighting and also with an artificial IR illumination source. The difference between the two measurements provides an inferred target range within the scene. This modulation method provides a very cost-effective method of target ranging, yet does not require extreme power levels as created by typical solar exposure which can be cost prohibitive. According to another embodiment, the modulation technique may be implemented with a carrier signal as disclosed in U.S. Pat. No. 6,298,311, entitled "INFRARED OCCUPANT POSITION AND RECOGNITION SYSTEM FOR A MOTOR VEHICLE," the entire disclosure of which is hereby incorporated herein by reference.

Figure 13:
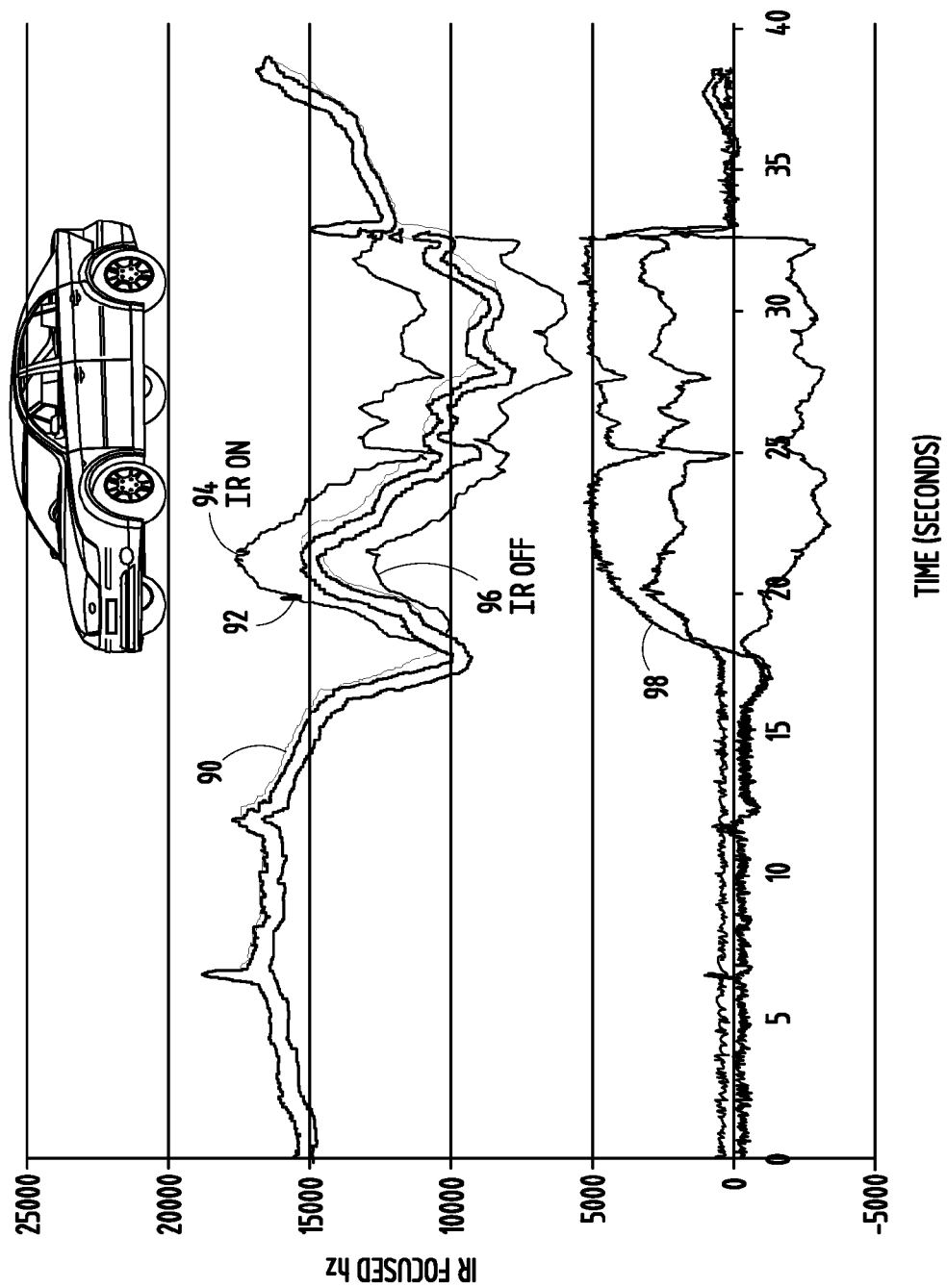
FIG. 13 illustrates receiver output signals and ripple signal in frequency (Hz) as a function of time as the host vehicle drives by another vehicle, according to one example.

Referring to FIG. 13, the modulation technique is illustrated in connection with an example of sensed IR and ripple signal both when a parked vehicle is located in the lateral side detection zone of the host vehicle 10 and when the parked vehicle is removed from the detection zone. As shown, the sensed raw irradiance or received light energy level is plotted as a function of time versus frequency as the host vehicle drives by the parked car shown at top at time of about eighteen (18) seconds to a time of about thirty-three (33) seconds, such that initially there is no car on the lateral side of the host vehicle up until time equals eighteen (18) seconds, and the car passes through the detection zones and then departs the detection zones at time equals thirty-three (33) seconds. Initially, sunlight reflected from asphalt is detected at line 90 and a shadow is detected as indicated. Once the parked vehicle enters the detection zone, the received raw IR irradiance or light energy indicated by area 92 between lines 94 and 96 increases between max and min values when the IR transmitter is turned on at max border 94 and when the IR transmitter is turned off at min border 96. The difference between the IR turned on and off signals is represented by the ripple signal 98 which goes from approximately zero (0) frequency to a frequency of about five thousand (5,000) when the lateral location vehicle passes through the detection zone, and returns to a value of near zero (0) when the lateral located parked vehicle departs the detection zone. The modulation techniques advantageously allows for detection of an object due to reflected signal independent of shadow or sunlight.

The data shown in FIG. 13 illustrates frequency data where the object was generally in the center of the images and the IR illumination alternates from on to off. This data yielded a ripple signal 98 of around one hundred (100) hertz of variation in the raw data when looking at the asphalt, and about five thousand (5,000) hertz with a white target at about six (6) feet, according to one example. The ripple signal 98 did not change even though the ambient lighting moved from a full sun exposure from the time period of about zero to ten (0 to 10) seconds to the shadow of the vehicle at about the time period of about seventeen (17) or eighteen (18) seconds. The data shown in FIG. 13 was taken within a 950 nanometer band which requires rather expensive optical bandpass filters to eliminate sunlight. The modulation technique allows for operation with a much less costly high wavelength filter, such as greater than 700 nanometers.

Given the ripple signal 98 generated in the table of FIG. 13, the modulation technique enables the range estimation to be enhanced with acquisition from the calibration table shown in FIG. 10. As seen in FIG. 10, a white object's range can be fairly well predicted as shown by the curve 70A representing white paper. Dark objects are also predictable as shown by the curve 70H representing asphalt. Textured fabrics may exhibit a self-shadowing effect. By use of this inferred range information and the event progression of the multiple spot data, a side impact risk estimate can be made and, if deemed of sufficient risk, the side air bags can be deployed. By monitoring the ripple current 98 shown in FIG. 13, for each coverage zone, the ranges as shown by lines 72A, 72B and 72C may be established, for example. By looking at common points within the set of ranges 72A-72C, an enhanced range estimate may be established. In the given example, ranges 72A-72C have a common range value of about six feet. Since the frequency output of the IR photodetectors may vary based upon color or reflectivity in combination with a range, an enhanced range estimate may be provided by looking for common range values within the zones.

Figure 14:
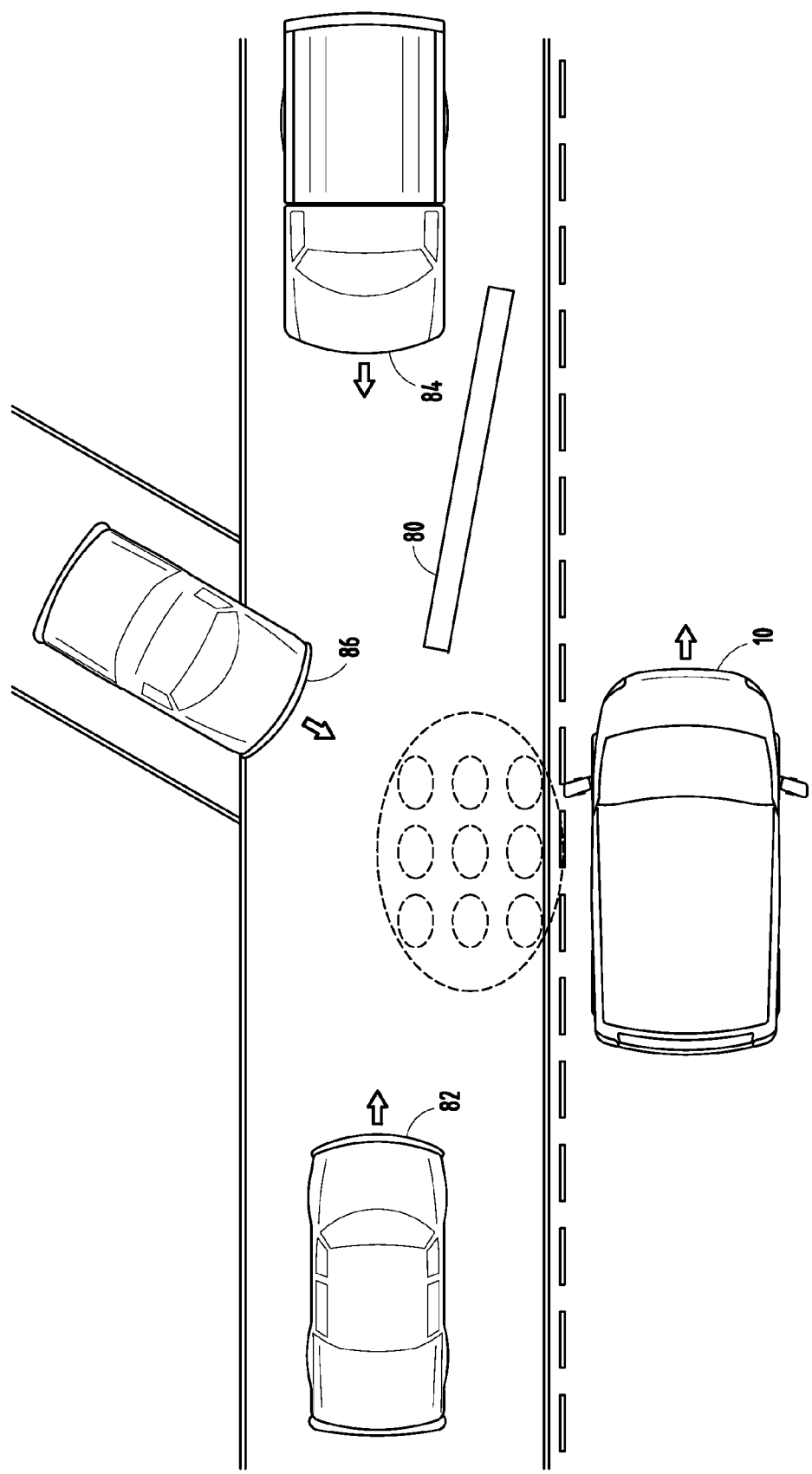
FIG. 14 illustrates the host vehicle traveling relative to a stationary barrier, lateral displaced vehicles and a lateral approaching vehicle, to illustrate terrain normalization, according to one embodiment.

The pre-crash sensing system 10 further employs a terrain normalization method to normalize out stationary objects that pass through the detection zones to the lateral side of the vehicle 10. Referring to FIG. 14, an example driving scenario is shown illustrating a host vehicle 10 employing the sensing system 20 is traveling along a roadway relative to several objects including an angled barrier 80, a lateral oncoming vehicle 84, a passing lateral vehicle 82, and a laterally projecting vehicle 86 expected to collide with the host vehicle 10. The terrain normalization method is able to normalize out stationary objects, such as the angled barrier 80 which, due to its shape, may appear to be moving toward the host vehicle 10, such that the system 20 may ignore the stationary object 84 in determining whether or not an impending lateral collision will occur. By use of range data, which is inherent to the power level of the reflected signal, a three-dimensional volume can be estimated with the array of coverage zones 34A-34I. As the host vehicle 10 is driven forward, the frontmost beams will detect a terrain pass by of an object. This terrain information, including inferred distance, is propagated to the successive rearward beams which follow and is used to normalize out the existence of stationary objects which are characterized as clutter to be ignored. Objects which have a lateral velocity component are recognized as potential oncoming targets and their characteristics are further evaluated for assessed threat of a lateral collision to the host vehicle 10.

In particular, physical objects such as an angled barrier (e.g., a guardrail) or an angled road line may have a shape resembling an oncoming vehicle bumper and can produce similar or identical IR pattern signatures which possibly could cause undesirable deployment of an air bag or other device when not properly detected. The terrain normalization method attempts to detect and eliminate such false triggers. With the transmitter and receiver arrangement shown, a matrix of infrared beams and receiving beams illuminate the side of the host vehicle 10 to provide a sensed volume by the three-by-three (3×3) array. Using range data, which is inherent to the power level of the reflected signal, a three-dimensional volume can be estimated. As the host vehicle 10 is driven forward, the frontmost beams or zones will see the terrain pass by first. This terrain information includes distance that is propagated to subsequent following beams which follow behind in progression and are used to normalize out stationary objects. Objects which have a lateral velocity component are recognized as potential oncoming targets to the host vehicle 10, and their characteristics are further evaluated for assessed threat to the host vehicle 10.

Each scan of the matrix yields an object light level for each spot of the zones detected. From this, the range (distance) of an object can be inferred according to a distance look-up table. Generally, objects which are at ground level are quite low in reflected energy as power is related to one divided by the distance squared. As seen in FIG. 14, barriers and oncoming cars illuminated by using the leading spot zones and propagating this information rearward to the trailing spots is achieved with a normalization technique. The data may be processed by averaging, normalization, and time differential, amongst other embodiments. Additionally, road speed and steering angle could be used to propagate the optical distance of the measured lead objects rearward, thus, eliminating them from causing false deployments. In a similar manner, the detection of objects entering the rearmost zones first are processed in reverse, such as when a car passes the host vehicle 10. The resultant matrix of processed data which has been normalized to remove oncoming and passing objects is used to evaluate the event propagation of a lateral object, such as an oncoming laterally moving vehicle 86.

Referring to FIGS. 15A-15D, the progression of a stationary object is illustrated as a host vehicle 10 passes by stationary object 84. As seen in FIG. 15A, the stationary object 84 is in front of the nine detection zones. As the host vehicle 10 moves forward to the lateral side of a stationary object 84, the stationary object 84 is shown first being detected by zone A1 in FIG. 15B, and then detected by both zones A1 and A2 in FIG. 15C, and then detected by zones A1-A3 in FIG. 15D. Finally, as the object 84 departs at least part of the detection zone, the object 84 is shown in FIG. 15E departing zone A1 and is still detected in zones A2 and A3. In this scenario, the system 20 employs a normalization routine to subtract out the propagated signal detected in a forward located zone from the raw data in an attempt to detect whether or not a lateral motion of the object is occurring. As seen in FIGS. 15A-A-15E-E, the detection of the object 84 in zone A1 is detected and as it approaches zone A2, the propagated signal of zone A1 is subtracted from the raw data of zone A2 to provide a normalized result indicative of a stationary object which should be rejected.

Referring to FIGS. 16A-16D, a scenario is shown in which a stationary object 80 in the form of an angled barrier, for example, is passed by the host vehicle 10 and the system 20 employs terrain normalization to reject the stationary object 80, despite its potentially deceiving shape due to its angle towards the vehicle 10. In this example, the stationary object 80 first enters zone A1 in FIG. 16A, and then proceeds to enter zone A2 in FIG. 16B. In FIG. 16C, the stationary object 80 is detected by zones A1, A2 and B1, and then in FIG. 16D, the stationary object 80 is detected primarily in zones A3, B2 and C1. As the stationary object passes from zone A1 through and into zones A2, A3 and B1, the terrain normalization subtracts the propagated signal of the leading zone from the following zone. For example, in zone A2, the normalized result is that the propagated signal of zone A1 is subtracted from the raw data of zone A2 to determine that the stationary object 80 is detected and should be rejected. The propagated signal is subtracted based on a delay time which is determined based on the speed of host vehicle 10, such that the signal data of the preceding zone captures an area of space that is also captured in the following zone. The terrain normalization thereby takes into consideration the detected signal information from the preceding zone taking into consideration the time delay and the speed of the host vehicle 10.

Figure 17B:
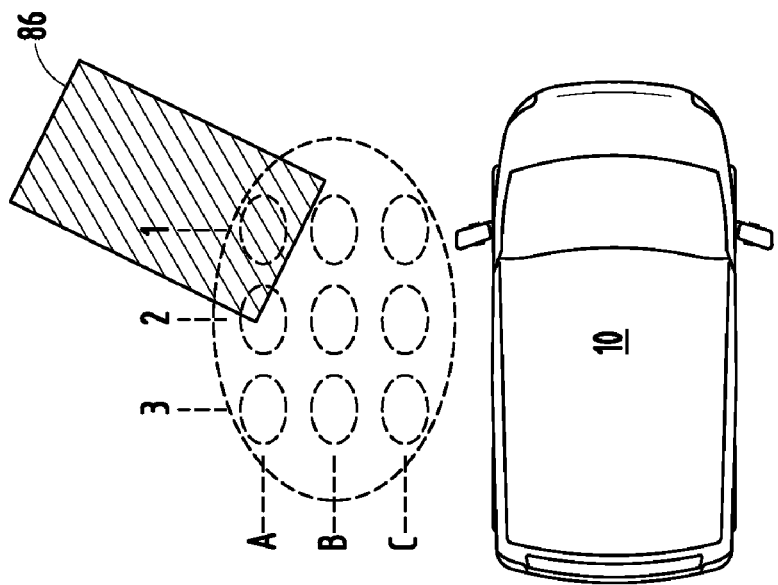
FIGS. 17A-17D illustrate terrain normalization on an object moving laterally with respect to the host vehicle, according to one example.
Figure 17A:
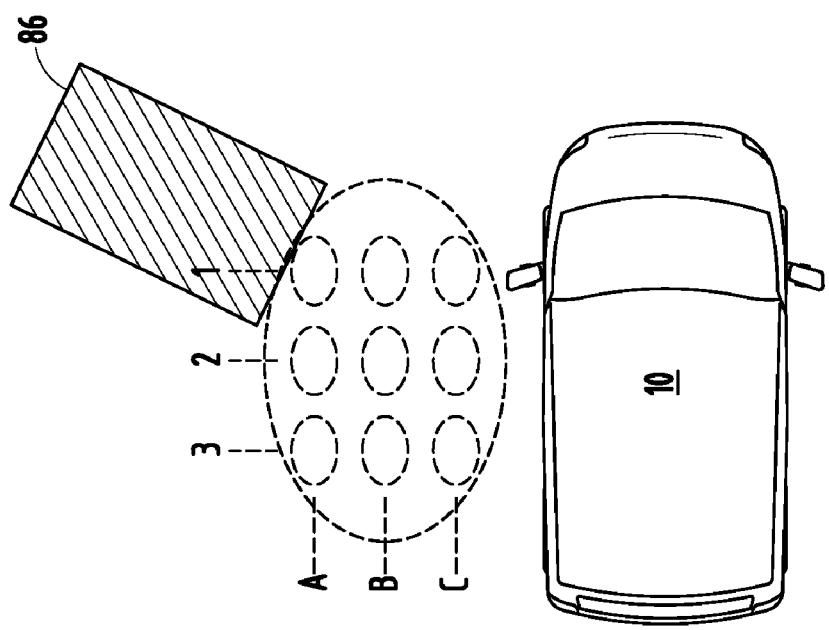
Figure 17D:
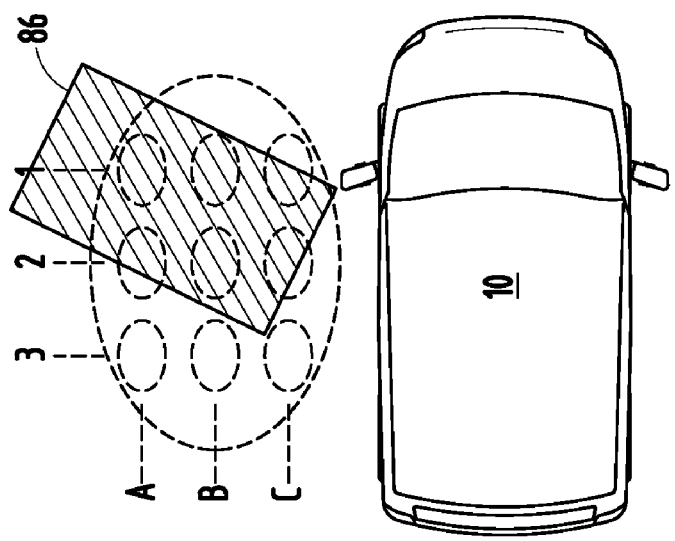
Figure 17C:
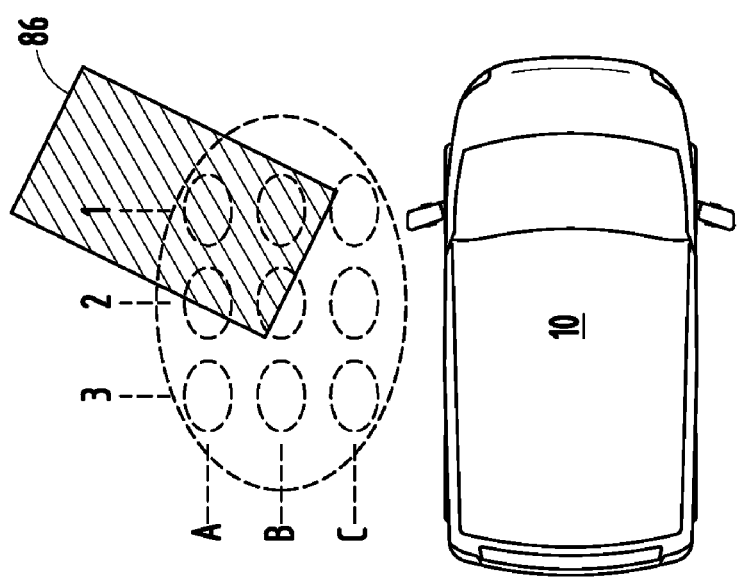

Referring to FIGS. 17A-17D, a further example of a laterally oncoming vehicle 86 is illustrated in which the laterally oncoming vehicle 86 first enters zone A1 and A2 in FIG. 17B and proceeds into zones B1, B2, A1, A2 and C1 in FIG. 17C, and finally proceeds into zones A1, A2, B1, B2 and C1-C3 in FIG. 17D. The terrain normalization effectively removes stationary objects so that the system 20 can detect that the laterally oncoming vehicle 86 is not stationary, but instead is moving with a lateral velocity component toward the host vehicle 10, such that an oncoming collision may occur.

Figure 18A:
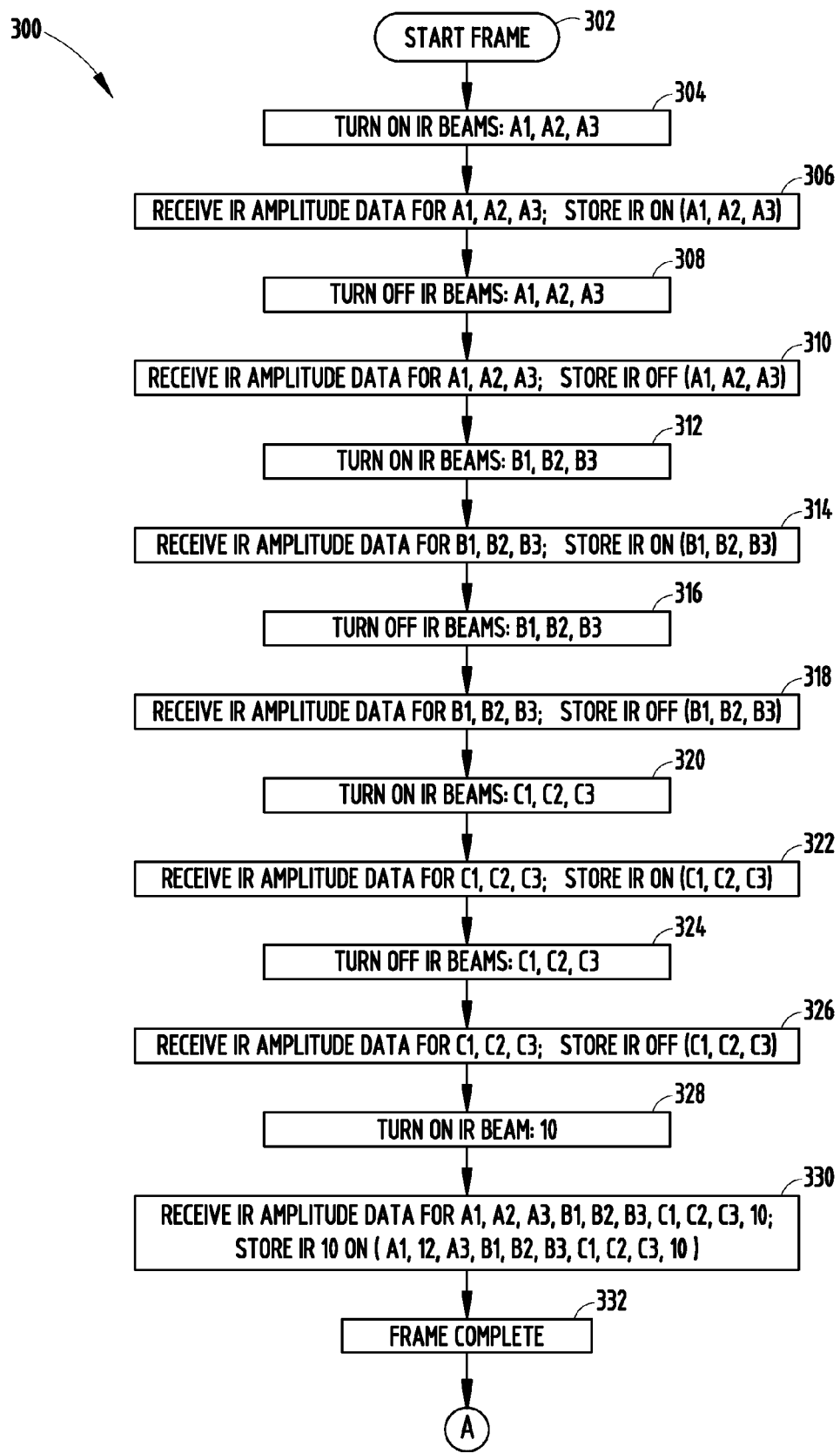
FIGS. 18A-18C illustrate a routine for providing terrain normalization, according to one embodiment.
Figure 18B:
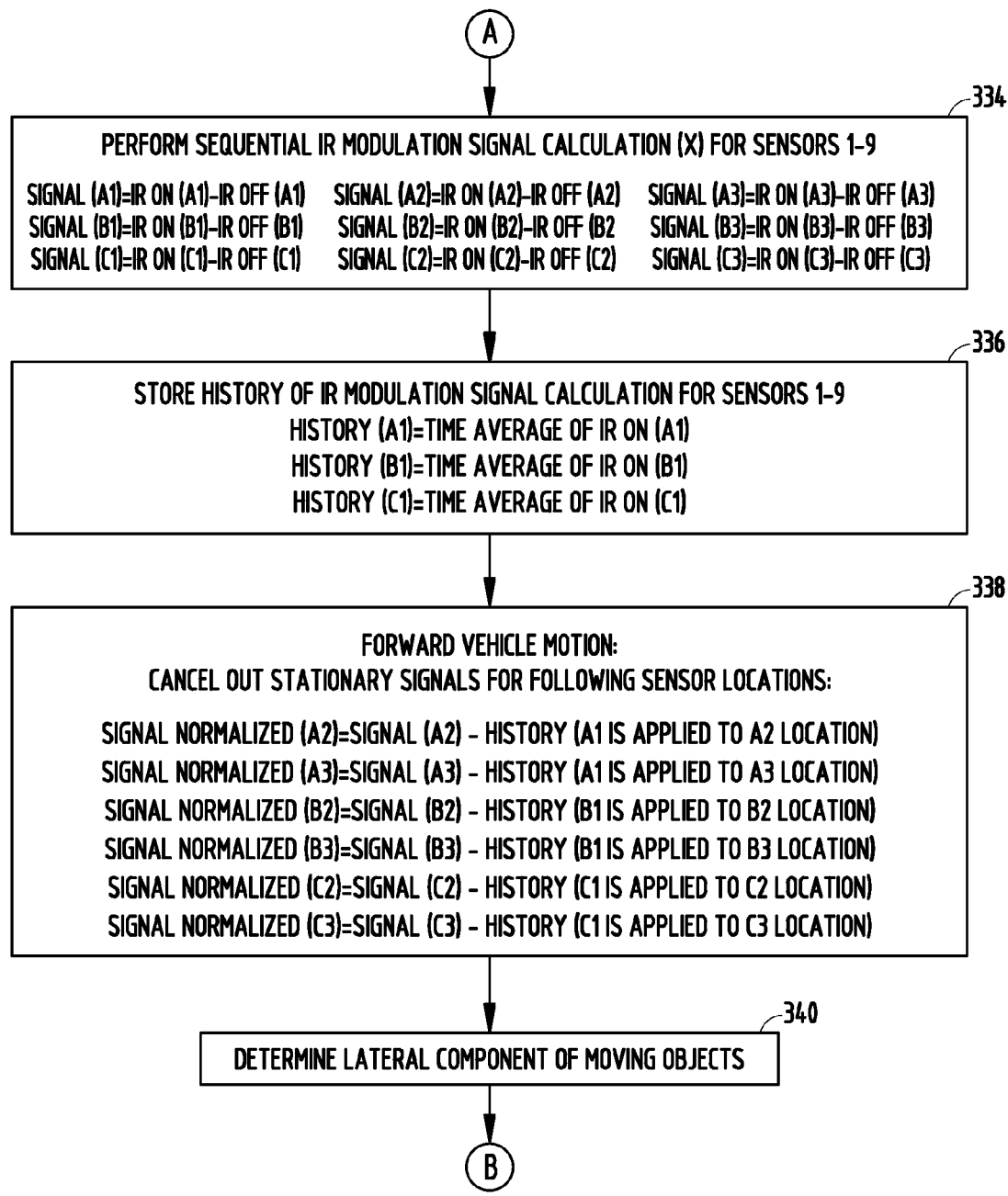
Figure 18C:
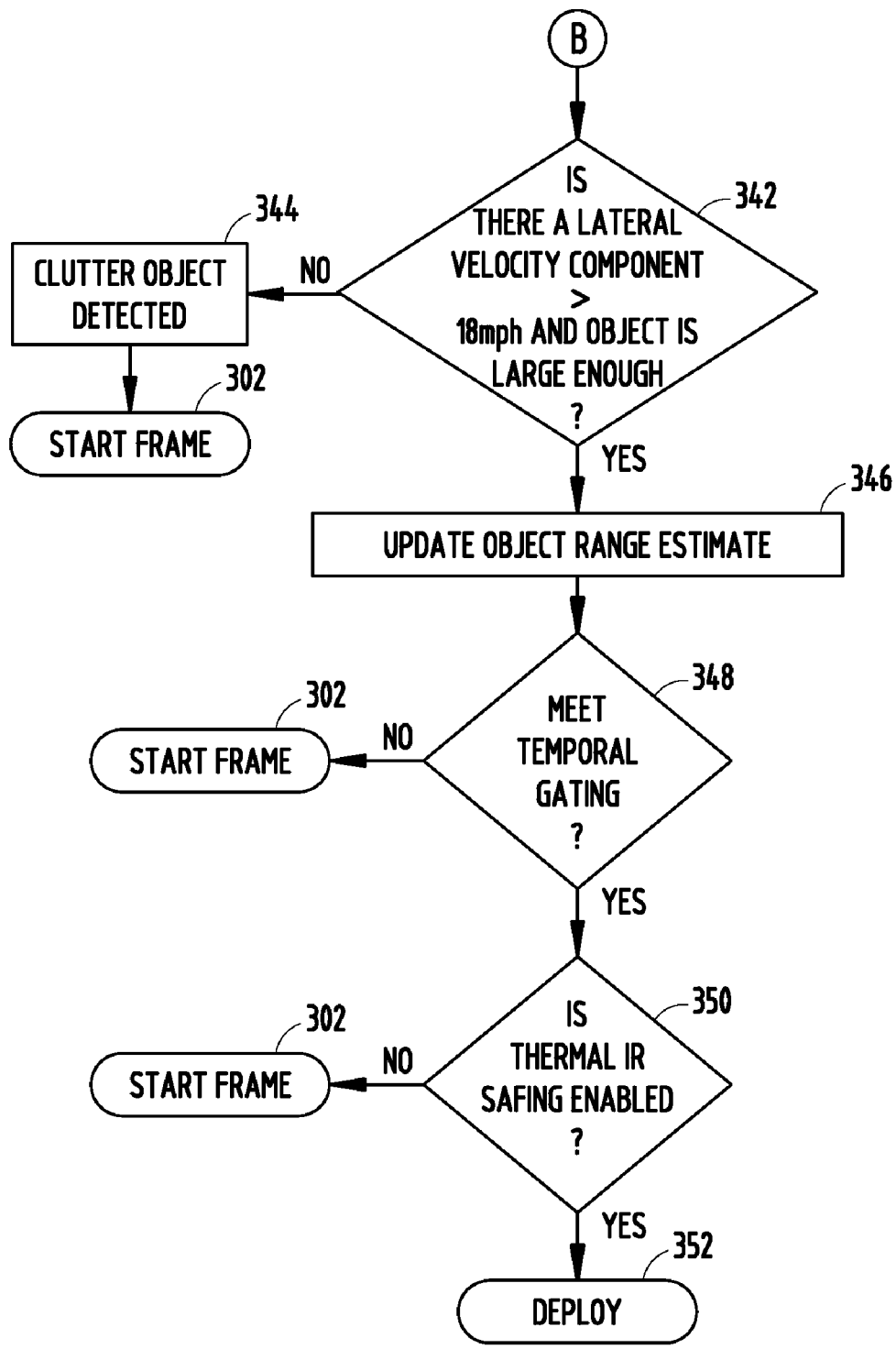

Referring to FIGS. 18A-18C, the terrain normalization routine 300 is illustrated, according to one embodiment. The terrain normalization routine 300 begins at step 302 and proceeds to step 304 to illuminate the outermost row of IR transmit beams in zones A1, A2 and A3. Next, in step 306, routine 300 receives the IR amplitude data for receive zones A1, A2 and A3 while the IR is turned on. Next, the IR transmit beams for zones A1, A2 and A3 are turned off. Proceeding to step 310, routine 300 receives the IR amplitude data for zones A1, A2 and A3 while the IR transmit beams are turned off and stores the received amplitude data while the IR transmit beams for zones A1, A2 and A3 are turned off. At step 312, routine 300 turns on the IR transmit beams for the next or middle row of zones B1, B2 and B3. In step 314, routine 300 receives the IR amplitude data for zones B1, B2 and B3 while the IR transmit beams are turned on and stores the received IR amplitude data in memory. At step 316, routine 300 turns off the IR transmit beams for zones B1, B2 and B3. With the IR transmit beams turned off, routine 300 proceeds to step 318 to receive the IR amplitude data for zones B1, B2 and B3 and stores the received IR amplitude data in memory.

Routine 300 proceeds to step 320 to turn on the IR transmit beams for the third or closest row of zones C1, C2 and C3. Next, at step 322, routine 300 receives the IR amplitude data for zones C1, C2 and C3 and stores the received IR amplitude data in memory. In step 324, routine 300 turns off the IR transmit beams for zones C1, C2 and C3. With the IR transmit beams turned off, routine 300 proceeds to step 326 to receive the IR amplitude data for zones C1, C2 and C3 and stores the received IR amplitude data in memory. Next, routine 300 turns on the IR transmit beam for the tenth or additional transmit beam at step 328. With the tenth or additional IR transmit beam turned on, routine 300 proceeds to step 330 to receive the IR amplitude data for zones A1, A2, A3, B1, B2, B3, C1, C2, C3, and the tenth receiver while the tenth or additional IR transmit beam is turned on. Finally, the initial frame is complete at step 332.

Once the frame is complete, routine 300 proceeds to step 334 to perform a sequential IR modulation signal calculation X for each of sensors one through nine, shown labeled A1-C3. This includes calculating the difference in signals when the IR transmit beam is turned on and when the IR transmit beam is turned off for each of zones A1-C3 to provide a raw ripple signal for each of zones A1-C3.

Proceeding on to step 336, routine 300 stores a history of the IR modulation signal calculation (X) for each of sensors one through nine for zones A1-C3. This involves storing the time average of the IR signals for each of the zones A1-C3.

At step 338, routine 300 looks at the forward vehicle motion and cancels out the stationary signals from the following sensor locations. This includes normalizing the signal for a given zone by subtracting out from the following zone the history of the previous zone. For example, the history of zone A1 is subtracted from zone A2 when an object passes from zone A1 to zone A2. The continued signal normalization applies to zone A3 in which the history from zones A1 and A2 is subtracted from zone A3 at the appropriate time based upon a time delay based on the vehicle speed. The time delay is based on vehicle speed so that the zones cover the same area of space. Signal normalization also occurs in rows B and C by subtracting out the signal from the prior zone. It should be appreciated that the same signal normalization applies in the reverse direction for a vehicle or object passing laterally from the rear of the host vehicle 10 toward the front of the host vehicle 10, except the signal normalization is reversed such that the propagating signal in zone A3 is subtracted from A2, etc. For example, for zone A2, you take the current X2 data and subtract off the history of zone A3 such that a sliding window essentially is provided. The terrain normalization essentially eliminates the fore and aft movement parallel to the host vehicle 10 in the detection zones. By doing so, stationary objects or clutter are rejected.

Routine 300 then proceeds to step 340 to determine the lateral component of the moving object. The lateral component of an object is based on the lateral movement toward or away from the lateral side of the host vehicle 10. Next, in decision step 342, routine 300 determines if there is lateral velocity component greater than eighteen miles per hour (18 mph) and if the object is large enough and, if so, proceeds to step 346 to update the object range estimate, and then proceeds to decision step 348 to check the temporal gating. If the object is not large enough or if the lateral velocity component is not greater than eighteen miles per hour (18 mph), routine 300 returns to step 302. At the decision step 348, temporal gating is compared to determine whether or not an object is likely to collide with the host vehicle 10 and, if so, routine 300 proceeds to decision step 350 to determine if thermal IR safing is enabled and, if so, deploys an output at step 352. If the thermal IR safing is not enabled, routine 300 returns to step 302. It should be appreciated that the temporal gating of step 348 and the thermal IR safing of step 350 may be the same or similar to those steps provided in routine 100 as discussed above.

While a thermal far IR safing receiver 46 is shown and described herein for providing thermal IR safing, it should be appreciated that other safing techniques may be employed to eliminate false triggers. As described, a matrix of IR beams illuminates the side of host vehicle 10 to provide a sensed volume. A single IR beam may be provided in a matrix of beams. Using range data, which is inherent to the power level of the reflected signal, a three-dimensional volume can be estimated. The addition of a separate technology to "safe" the primary deploy signal is required to ensure against false air bag deployment. "Safing" is defined as a complementary measure to verify that the detected object is an oncoming laterally moving vehicle where the measured speed of the oncoming laterally moving vehicle matches the speed measured by the primary detection. Moreover, the measured speed may be approximately fifteen (15) to fifty (50) miles per hour, according to one example. Additionally, this concept of lateral velocity verification can be used to enable sub-fifteen mile per hour air bag deployment.

Use of discrimination sensors to assess data to do a lateral velocity calculation of the oncoming laterally moving vehicle compared to the safing lateral velocity may be provided. If the two are similar, it can be assumed with a high degree of confidence that the oncoming object is indeed a sufficient threat to the occupants of the host vehicle 10. Objects which have a significant lateral velocity component, such as those greater than eighteen (18) miles per hour, may be recognized as potentially dangerous targets and their characteristics may be evaluated for assessed threat to the host vehicle 10. Each scan of the matrix yields an object light level for each spot or zone. An analysis of the light levels from all the spots can infer the distance, velocity and trajectory of an object from the host vehicle 10.

Discrimination technology considered for the safing technique can include active near IR (NIR) radar, or camera. One or more safing technology and one or more deploy technology may be utilized in the design. Individual safing or deploy technologies can include active near IR, far IR (FIR), ultrasonic acoustics, laser time-of-flight sensor (3D scanner), 3D camera, or stereo camera.

Employing the thermal IR safing technique, heat may be detected from an oncoming vehicle. According to an ultrasonic sensed safing technique, ultrasonic sensors perform the safing function. The safing function is employed to ensure the event progression is due to an incoming vehicle and not due to other situations that would not require a side air bag deployment. Safing may prevent deployment of a side air bag when the host vehicle 10 strikes a stationary object, such as a tree, pole or parked vehicle. These objects are not likely to have the thermal signature of a moving vehicle, and in extreme yaw conditions, may not return a steady ultrasonic return which is especially true for trees and poles. Therefore, there is a need to relate a means to disable or reduce safing requirements in yaw conditions.

Situationally dependent safing is a method to modify side air bag pre-impact deployment safing based upon the vehicle stability. During normal vehicle conditions, an active IR sensing system is employed to determine when a side impact is imminent. Supplemental information from either an ultrasonic or passive IR system is used for safing. If the host vehicle 10 path is tangent to its four-aft direction or the target follows a linear path into the side of the host vehicle 10, incoming targets will follow a normal progression and safing techniques will provide information necessary to make a reliable decision. A relatively linear progression will allow sufficient path information of the active IR system to generate a mature path. In extreme yaw conditions, however, the path of the host vehicle 10 may not allow the development of a mature track for impacts. Moreover, the supplemental safing sensors are less likely to provide adequate information to supplement the deployment condition. If an ultrasonic sensor is employed, the host vehicle 10 may spin into the target too quickly to provide an adequate return. If a passive IR system is employed, the target may not generate the thermal signature necessary to allow deployment. Therefore, a decision tree may allow for safing levels to be reduced in cases where the host vehicle 10 is not following a consistent path due to the high yaw. The decision tree may include logically ORing the following requirements: Far IR (FIR) is greater than threshold, steering wheel angular rate is greater than N degrees per second, yaw is greater than N degrees per second, external lateral slip divided by yaw, and lateral acceleration greater than 0.5 g. The output of the OR logic is then logically ANDed with the discrimination output to determine whether or not to deploy one or more devices.

Additionally, vehicle travel direction can be inferred by the ground terrain monitoring of the active IR scanning system. By use of both left and right pre-crash side sensors to monitor the optical flow of asphalt pattern directions, the vehicle velocity and direction including lateral sliding can be detected and approach countermeasures initiated. Under inclement conditions, such as blowing snow/rain/sand side slip monitoring is failed-safed by a lateral yaw rate sensor. Lateral sliding information can be used for side air bag threshold lowering, stability control, or potentially rollover detection. The lateral slip sensor may use a left or right sensor to monitor road pattern directions. With the transmit/receive beams, an optical flow through beam matrix determines ground travel direction, vehicle rotation and potential vehicle roll.

As mentioned herein, the array of transmit and receive IR beams may be arranged in an overlapping configuration. Tailoring of three-dimensional volume to the side of the host vehicle 10 can pose a challenge to ensure an oncoming laterally moving vehicle is detected and a side air bag is deployed, yet allow the numerous no-deploy objects which pass harmlessly by the host vehicle 10 to not cause false deploys. The beam overlap may allow increased spatial resolution with a minimum number of discrete beams by use of the beam overlap. In order to increase the effective spots or zones of a pre-crash side impact sensor without adding more channels, each of the nine beam spots may be enlarged to allow a twenty percent (20%) beam spot overlap which provides twenty-one multiplexed zones, in contrast to the above disclosed nine non-overlap zones, which allows increased distance resolution of the incoming object. The geometry can apply to IR illumination or light receiver shape or possibly both transmitter and receiver shapes for more resolution. Accordingly, the beam overlap method may consist of overlapping scanned areas or regions to allow increased target tracking resolution.

Accordingly, the pre-crash sensing system 20 of the present invention advantageously detects an impending collision of an object with the host vehicle 10, prior to the actual collision. The crash sensing system 20 is cost affordable and effective to determine whether an object is approaching the host vehicle 10 and may collide with the vehicle, sufficient to enable a determination of the impending collision prior to actual impact. Further, the pre-crash sensing system 20 may determine whether the object is of sufficient size and speed to deploy certain countermeasures.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A vehicle pre-impact sensing system comprising:
an array of infrared light emitters mounted on a vehicle and configured to emit infrared light into multiple transmit zones spaced from the vehicle;
an array of infrared light detectors mounted on the vehicle, wherein each detector is configured to detect infrared light intensity of infrared light received, and output a reflected signal indicative of the infrared light intensity reflected from an object located in one or more multiple receive zones proximate to the transmit zones, wherein the reflected signals are indicative of the object being in certain one or more receive zones; and
a processor for processing the reflected signals and determining range, location, speed and direction of the object, wherein the processor is configured to selectively turn each of the infrared light emitters on and off in multiple combinations, determine a difference in the reflected signals for each receive zone with the infrared light emitters turned on and turned off, determine, based on those differences, whether the object is expected to impact the vehicle as a function of the determined range, location, speed and direction of the object, and generate an output indicative of a sensed pre-impact event.

2. The sensing system as defined in claim 1, wherein the infrared light emitters are operated by turning the infrared light emitters on and off at a rate of about 300 Hz.

3. The sensing system as defined in claim 1, wherein the difference in sensed signals provides a ripple signal indicative of changes in the reflected signals as the infrared light transmitters are turned on and off, wherein the ripple signal is compared to a calibration table to detect a feature of the object.

4. The sensing system as defined in claim 1, wherein the system senses an object on a lateral side of the vehicle.

5. The sensing system as defined in claim 1, wherein the processor further determines size of the object, and wherein the processor generates an output signal indicative of a sensed pre-impact event further based on the determined size of the object.

6. The sensing system as defined in claim 1 further comprising an additional infrared light detector for detecting infrared light within an additional beam area intersecting one or more of the receive zones, wherein an additional received signal output by the additional infrared light detector is subtracted from the reflected signals to remove noise.

7. The sensing system as defined in claim 1, wherein the transmit zones and the receive zones are characterized as cone-shaped beams.

8. A method of detecting an expected impact of an object with a vehicle, said method comprising the steps of:
emitting infrared light with an array of infrared light emitters into multiple transmit zones incrementally spaced from the vehicle, wherein infrared light is emitted into one or more zones at a time by various combinations of light from the array of infrared light emitters;
detecting infrared light with an array of infrared light detectors, said infrared light reflected from an object located in the one or more multiple receive zones indicative of the object being in certain one or more received zones;
outputting by the infrared light detectors reflected signals indicative of an intensity of the infrared light reflected by the object;
processing the reflected signals;
determining a difference in the reflected signals for each zone with the transmitters turned on and off;
determining, based on the differences, whether the object is expected to impact the vehicle as a function of the determined range, location, speed and direction of the object; and
generating an output indicative of the sensed pre-impact event.

9. The method as defined in claim 8 further comprising the step of determining a ripple signal based on the difference and using the ripple signal to detect a feature of the object.

10. The method as defined in claim 9, wherein the detected feature of the object is used to enhance the determination of range to the object.

* * * * *